US010871095B2

(12) United States Patent
Nishizawa et al.

(10) Patent No.: US 10,871,095 B2
(45) Date of Patent: Dec. 22, 2020

(54) REGENERATION CONTROL DEVICE FOR EXHAUST GAS TREATMENT DEVICE

(71) Applicant: MITSUBISHI HEAVY INDUSTRIES ENGINE & TURBOCHARGER, LTD., Sagamihara (JP)

(72) Inventors: Kazuki Nishizawa, Tokyo (JP); Tomohide Yamada, Tokyo (JP); Daisuke Sato, Tokyo (JP); Yasuhiro Hattori, Tokyo (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 50 days.

(21) Appl. No.: 16/313,417

(22) PCT Filed: Jun. 30, 2016

(86) PCT No.: PCT/JP2016/069463
§ 371 (c)(1),
(2) Date: Dec. 26, 2018

(87) PCT Pub. No.: WO2018/003067
PCT Pub. Date: Jan. 4, 2018

(65) Prior Publication Data
US 2019/0162092 A1  May 30, 2019

(51) Int. Cl.
*F01N 3/20* (2006.01)
*F02D 41/02* (2006.01)
(Continued)

(52) U.S. Cl.
CPC .............. *F01N 3/20* (2013.01); *F01N 3/023* (2013.01); *F01N 5/02* (2013.01); *F02D 41/025* (2013.01);
(Continued)

(58) Field of Classification Search
CPC combination set(s) only.
See application file for complete search history.

(56) References Cited

U.S. PATENT DOCUMENTS 8,794,057 B2 * 8/2014 Ardanese ............ F01N 11/007
                                                73/114.75
9,181,841 B2 * 11/2015 Leu ..................... F01N 11/002
(Continued)

FOREIGN PATENT DOCUMENTS

EP      1669565 A1    6/2006
EP      1852581 A1    11/2007
(Continued)

OTHER PUBLICATIONS

International Search Report issued in PCT/JP2016/069463 (PCT/ISA/210), dated Sep. 27, 2016.
(Continued)

*Primary Examiner* — Binh Q Tran
(74) *Attorney, Agent, or Firm* — Birch, Stewart, Kolasch & Birch, LLP.

(57) ABSTRACT

A regeneration control device controlling a temperature increase unit of an exhaust gas treatment device including a DOC disposed in an exhaust passage of a diesel engine to regenerate the exhaust gas treatment device includes: a DOC temperature-increase-necessary-state detection part detecting a temperature increase necessary state including at least one of a blockage state, detected on the basis of comparison between a blockage parameter related to blockage of the DOC and a predetermined blockage threshold, of the DOC or a blockage risk state, detected when the diesel engine is in an operating state that is likely to cause blockage of the DOC, of the DOC; and a DOC temperature increase execution part executing a DOC temperature increase control including: a first temperature increase process to control the temperature increase unit, if the temperature increase nec-
(Continued)

essary state of the DOC is detected, so as to increase the temperature of the DOC to a first temperature at which the DOC activates; and a second temperature increase process to control the temperature increase unit after completion of the first temperature increase process so as to increase the temperature of the DOC to a second temperature higher than the first temperature.

18 Claims, 11 Drawing Sheets

(51) Int. Cl.
  *F02D 41/40*  (2006.01)
  *F01N 3/023*  (2006.01)
  *F01N 5/02*  (2006.01)
(52) U.S. Cl.
  CPC ....... *F02D 41/029* (2013.01); *F02D 41/0235* (2013.01); *F02D 41/405* (2013.01); *F01N 2610/105* (2013.01)

(56) References Cited

U.S. PATENT DOCUMENTS 9,695,732 B2 * 7/2017 Fujie ................. F01N 3/035
9,719,440 B2 * 8/2017 Nishizawa .............. F01N 3/023
2004/0226288 A1 * 11/2004 Okugawa ................ F01N 3/035
                                                                60/295
2016/0222900 A1    8/2016 Nishizawa et al.
2016/0333761 A1 * 11/2016 Liu ..................... F01N 3/006

FOREIGN PATENT DOCUMENTS

| EP | 2441934 A2    | 4/2012  |
| EP | 2568134 A1    | 3/2013  |
| EP | 3396129 A1    | 10/2018 |
| JP | 2010-31833 A  | 2/2010  |
| JP | 2010-101200 A | 5/2010  |
| JP | 2011-69323 A  | 4/2011  |
| JP | 2012-127297 A | 7/2012  |
| JP | 2013-68184 A  | 4/2013  |
| JP | 2013-122181 A | 6/2013  |
| JP | 2013-122182 A | 6/2013  |
| JP | 2015-68233 A  | 4/2015  |
| JP | 2015-218605 A | 12/2015 |

OTHER PUBLICATIONS

Written Opinion of the International Searching Aithority issued in PCT/JP2016/069463 (PCT/ISA/237), dated Sep. 27, 2016.
Office Action dated Mar. 19, 2019 issued in the corresponding Japanese Application No. 2015-110883 with a Machine Translation.
European Office Action, dated Sep. 3, 2019, for European Application No. 16907300.4.
Extended European Search Report, dated Apr. 17, 2019, for European Application No. 16907300.4.

* cited by examiner

REGENERATION CONTROL DEVICE FOR EXHAUST GAS TREATMENT DEVICE

TECHNICAL FIELD

The present disclosure relates to a regeneration control device which removes blockage of a diesel oxidation catalyst (DOC) disposed in an exhaust passage and regenerates the DOC.

BACKGROUND ART

A diesel engine is equipped with an exhaust gas treatment device including a diesel oxidation catalyst (DOC) disposed in an exhaust passage and a diesel particulate filter (DPF) disposed on the downstream side of the DOC. The diesel particulate filter (DPF) is a device for collecting particulate matters (PM) contained in exhaust gas discharged from the diesel engine. The DPF is normally formed of ceramic or the like in a honeycomb-shaped monolith with adjacent vents closed alternately on the inlet side and the outlet side so that exhaust gas passes through filtering walls which remove PM. The DPF may support a catalyst. Accumulation of PM in the DPF eventually brings about blockage, which leads to not only a decrease in the PM-collecting performance of the DPF but also to an increase in the exhaust pressure and thus has a negative effect on the fuel efficiency. In view of this, it is necessary to perform forced regeneration to remove the PM accumulated in the DPF every time a PM-accumulation amount reaches a predetermined amount or an engine operation time reaches a predetermined time.

Forced regeneration of the DPF is performed by forcedly increasing the inlet temperature of the DPF. In general, the inlet temperature of the DPF is forcedly increased by supplying non-combusted fuel to the exhaust gas treatment device by post injection, which is to inject fuel after a main-combustion injection timing, and oxidizing the non-combusted fuel with a diesel oxidization catalyst (DOC) so that the temperature of the non-combusted fuel increases. Further, combustion may be supplied by exhaust-pipe injection to an exhaust passage on the downstream side of the engine. The DOC is normally formed of ceramic or the like in a honeycomb-shaped monolith, similarly to the DPF, and supports oxidization catalyst on its inner surface.

In such an exhaust-gas post treatment device, if a state with a low operation load and a low exhaust-gas temperature continues, SOF or soot of non-combusted fuel or the like adheres to an upstream end surface of the DOC, and blockage of the DOC gradually progresses. If the DOC becomes blocked, the exhaust pressure increases and the fuel efficiency deteriorates, and the non-combusted fuel is not sufficiently oxidized by the DOC and slips, upon forced regeneration of DPF. In response, more and more non-combusted fuel is supplied to the DOC to increase the inlet temperature of the DPF to a predetermined temperature, thereby deteriorating the fuel efficiency. Further, the slipped fuel is oxidized and heated by the DPF supporting a catalyst, and thus promotes abnormal combustion of the PM, thereby raising the risk of heat damage to the DPF. Even further, in a case where the temperature is increased by late post injection, the post injection amount increases and the risk of oil dilution increases in accordance.

For instance, Patent Documents 1 and 2 disclose a technique for preventing blockage of a DOC. Patent Document 1 discloses a DPF regeneration control device whereby it is possible to prevent blockage of a DOC efficiently, and to recover the DOC reliably from the blockage even if the DOC is actually subject to blockage. Specifically, if a blockage parameter related to blockage of the DOC detected during automatic regeneration of DPF by a first temperature increase unit and a second temperature increase unit exceeds a predetermined blockage threshold for a predetermined time, it is determined that the DOC is blocked, and manual regeneration is performed, whose DPF regeneration temperature is higher than that in automatic regeneration. Further, if it is determined from the blockage parameter that the DOC is not blocked but in an initial stage of blockage, only the first temperature increase unit continues operation for a predetermined period of time after completion of automatic regeneration to maintain the temperature of heated DOC. On the other hand, during normal operation in which forced regeneration (automatic regeneration, manual regeneration) of the DPF is not performed, if it is estimated that the DOC has been likely to cause blockage, it is determined that the DOC is in a blockage risk state, and recovery operation is performed, in which only the first temperature increase unit is operated for a predetermined period of time.

Further, Patent Document 2 discloses combusting and removing non-combusted fuel adhering to the surface of the DOC by maintaining the exhaust-gas temperature at a predetermined temperature with an exhaust-gas temperature maintaining unit after completion of regeneration process of the DPF in a diesel engine.

CITATION LIST

Patent Literature

Patent Document 1: JP2015-68233A
Patent Document 2: JP2013-68184A

SUMMARY

Problems to be Solved

In Patent Documents 1 and 2, if the DOC is determined to be blocked, the DOC is recovered (from the blockage state) simultaneously with forced regeneration of DPF. However, blockage of the DOC may occur independently from the timing of forced regeneration of DPF. If the DOC is in the blockage state at the time of start of forced regeneration of DPF, there is a risk of slip of non-combusted fuel accompanied by deterioration in the fuel efficiency. Further, in Patent Document 1, if it is determined that the DOC is in a blockage risk state during normal operation, the temperature of the DOC is increased by the first temperature increase unit to recover the DOC from the blockage risk state. However, Patent Document 1 fails to disclose details of how the temperature of the DOC is increased.

The present inventors have reached novel findings regarding a temperature-increase temperature suitable for recovering the DOC from the blockage state. In this regard, Patent Document 2 merely discloses that the temperature is higher than the activation temperature of the DOC, that is, 300° C. or higher.

In view of the above, an object of at least one embodiment of the present invention is to provide a regeneration control device, whereby it is possible to reliably recover the DOC from the blockage state or the blockage risk state to regenerate the DOC.

Solution to the Problems (1) At least one embodiment of the present invention provides a regeneration control device controlling a temperature increase unit of an exhaust gas treatment device including a DOC disposed in an exhaust passage of a diesel engine to regenerate the exhaust gas treatment device, including: a DOC temperature-increase-necessary-state detection part configured to detect a temperature increase necessary state including at least one of a blockage state of the DOC or a blockage risk state of the DOC, the blockage state being detected on the basis of comparison between a blockage parameter related to blockage of the DOC and a predetermined blockage threshold, the blockage risk state being detected when the diesel engine is in an operating state that is likely to cause blockage of the DOC; and a DOC temperature increase execution part configured to execute a DOC temperature increase control including: a first temperature increase process to control the temperature increase unit, if the temperature increase necessary state of the DOC is detected, so as to increase a temperature of the DOC to a first temperature at which the DOC activates; and a second temperature increase process to control the temperature increase unit after completion of the first temperature increase process so as to increase the temperature of the DOC to a second temperature higher than the first temperature.

With the above configuration (1), when the temperature increase necessary state of the DOC is detected, the temperature increase process is executed in two stages: the first temperature increase process for activating the DOC; and then the second temperature increase process for removing substances adhering to the upstream end surface of the DOC. By executing the second temperature increase process after activation of the DOC through the first temperature increase process, it is possible to remove substances adhering to the upstream end surface of the DOC while suppressing discharge of hydrocarbon (HC). Specifically, the setting for heating to the second temperature can cause white smoke due to a large amount of HC which is not completely purified and reaches a tail pipe after discharge from the engine. In contrast, if the temperature is first increased to the first temperature at which the DOC activates by the first temperature increase where HC is less discharged, a large amount of HC which would be produced by the second temperature increase can be purified by the activated DOC, thus enabling heating to the second temperature without producing white smoke. Moreover, heating the DOC activated by the first temperature increase process to the second temperature (e.g., about 400° C.) enables removal of substances adhering to the upstream end surface of the DOC while preventing progress of blockage of the DOC. Thus, it is possible to regenerate the DOC from the temperature increase necessary state.

(2) In some embodiments, in the above configuration (1), the DOC temperature increase control is configured to be completed after elapse of a predetermined time after the second temperature increase process starts, or after elapse of a predetermined time after the second temperature increase process starts and reaches the second temperature.

With the above configuration (2), it is possible to have the DOC at the second temperature, at which substances adhering to the DOC can be combusted, for a predetermined time, and to regenerate the DOC from the temperature increase necessary state.

(3) In some embodiments, in the above configuration (1) or (2), the temperature increase unit includes a fuel injection device for injecting a fuel to a combustion chamber of the diesel engine, the first temperature increase process and the second temperature increase process are executed by early-post injection with the fuel injection device, and a fuel injection amount is greater in the second temperature increase process than in the first temperature increase process, or an injection timing varies between the first temperature increase process and the second temperature increase process, or the fuel injection amount is greater in the second temperature increase process than in the first temperature increase process and the injection timing varies between the first temperature increase process and the second temperature increase process.

With the above configuration (3), by changing the injection amount or the injection timing for the early-post injection with the fuel injection device, it is possible to easily execute the first temperature increase process and the second temperature increase process. Further, the first temperature increase process and the second temperature increase process both can be executed by the fuel injection device, which is usually provided to the engine. This eliminates the necessity of an additional temperature increase unit, reduces adjustment parameters, shortens the calibration time for optimization, and reduces the cost.

(4) In some embodiments, in any one of the above configurations (1) to (3), the exhaust gas treatment device further includes a DPF disposed in the exhaust passage and downstream of the DOC, the regeneration control device further includes a DPF forced regeneration execution part configured to execute a forced regeneration process to control the temperature increase unit so as to increase a temperature of the DPF to a third temperature, and the second temperature is higher than the first temperature and is lower than the third temperature.

In the above configuration (4), the second temperature (e.g., 400° C.) which the DOC reaches by the second temperature increase process is lower than the forced regeneration temperature (e.g., 600° C.) of the DPF. Thus, it is possible to reduce fuel for regenerating the DOC from the temperature increase state such as the blockage state, and improve the fuel efficiency.

(5) In some embodiments, in the above configuration (4), the DOC temperature-increase-necessary-state detection part is configured to detect the blockage parameter during execution of the forced regeneration process, and the DPF forced regeneration execution part stops the forced regeneration process if the DOC temperature-increase-necessary-state detection part detects the blockage state of the DOC.

With the above configuration (5), it is possible to prevent slip of non-combusted fuel due to blockage of the DOC upon execution of the forced regeneration process, and it is possible to prevent deterioration of fuel efficiency, burn damage to the DPF, and oil dilution. Further, when the blockage state of the DOC is detected only during execution of the forced regeneration process which causes the above problems, it is possible to reduce the load of the regeneration control device required for detecting the blockage state of the DOC during operation of the engine, and it is possible to efficiently detect the blockage state of the DOC.

(6) In some embodiments, in the above configuration (5), the DPF forced regeneration execution part automatically executes the forced regeneration process or issues notification to prompt execution of the forced regeneration process, after completion of the DOC temperature increase control.

When the forced regeneration process of the DPF is stopped, the DPF is assumed to be in a state where PM is still excessively accumulated on the DPF.

In the above configuration (6), if the forced regeneration process of the DPF is stopped, the forced regeneration process of the DPF is automatically executed, or notification is issued to prompt execution of the forced regeneration process of the DPF after completion of the DOC temperature increase control, regardless of whether the forced regeneration execution condition is satisfied. Thus, the suspended forced regeneration process of the DPF is performed again, so that PM accumulated on the DPF is reliably combusted. Further, since the forced regeneration process of the DPF is performed after completion of the DOC temperature increase control, it is possible to reduce energy such as fuel used for the forced regeneration process of the DPF.

(7) In some embodiments, in the above configuration (4), the regeneration control device further includes a DPF forced-regeneration-condition determination part configured to determine whether a forced regeneration execution condition for the DPF is satisfied, and the DPF forced regeneration execution part automatically executes the forced regeneration process or issues notification to prompt execution of the forced regeneration process, after completion of the DOC temperature increase control, if the DPF forced-regeneration-condition determination part determines that the forced regeneration execution condition is satisfied after completion of the second temperature increase process.

When the forced regeneration process of the DPF is not stopped, for instance, even if the DOC temperature increase control is executed as the DOC is in the blockage risk state, the forced regeneration execution condition for the DPF can be satisfied due to some factors.

In the above configuration (7), even if the forced regeneration process of the DPF is not stopped, the forced regeneration process of the DPF is automatically executed, or notification is issued to prompt execution of the forced regeneration process of the DPF after completion of the DOC temperature increase control if the forced regeneration execution condition is satisfied. Thus, PM accumulated on the DPF is reliably combusted. Further, since the forced regeneration process of the DPF is performed after completion of the DOC temperature increase control, it is possible to reduce energy such as fuel used for the forced regeneration process of the DPF.

(8) In some embodiments, in any one of the above configurations (4) to (7), the temperature increase unit includes a fuel injection device for injecting a fuel to a combustion chamber of the diesel engine, the forced regeneration process is executed by early-post injection with the fuel injection device and by late-post injection with the fuel injection device or exhaust pipe injection with an exhaust pipe injection device disposed in the exhaust passage and upstream of the DOC.

With the above configuration (8), it is possible to perform the forced regeneration process of the DPF using the fuel injection device or the exhaust pipe injection device. Further, in a case where the temperature increase unit in the DOC temperature increase control is the fuel injection device, it is possible to easily perform the DOC temperature increase control and the forced regeneration process of the DPF by the fuel injection device. Further, since the engine is usually equipped with the fuel injection device, it is unnecessary to provide an additional temperature increase unit, and thus it is possible to reduce the cost.

(9) In some embodiments, in any one of the above configurations (4) to (8), the blockage parameter is an outlet temperature of the DPF.

With the above configuration (9), it is possible to easily and accurately detect the temperature increase necessary state of the DOC with an existing sensor.

(10) In some embodiments, in any one of the above configurations (1) to (9), during normal operation in which the forced regeneration process is not performed, the DOC temperature-increase-necessary-state detection part detects the blockage risk state of the DOC if an accumulated duration time, within a latest predetermined period, of a low exhaust temperature operation state exceeds a predetermined threshold, the low exhaust temperature operation state being a state where an exhaust gas temperature is lower than an exhaust temperature threshold.

If the exhaust gas temperature is continuously lower than the exhaust temperature threshold, that is, if the low exhaust temperature operation state continues, blockage of the DOC develops gradually. On the other hand, once the exhaust gas temperature exceeds the exhaust temperature threshold, that is, enters the high exhaust temperature operation state, blockage of the DOC starts to be removed.

Thus, with the above configuration (10), since the blockage risk state of the DOC is detected with the accumulated duration time of the low exhaust temperature operation state within a latest predetermined period, it is possible to accurately detect the blockage risk state of the DOC. Further, it is possible to prevent blockage (blockage state) of the DOC in advance.

(11) In some embodiments, in any one of the above configurations (1) to (10), the regeneration control device further includes a storage part for storing detection information indicating that the DOC temperature-increase-necessary-state detection part detects the temperature increase necessary state of the DOC.

With the above configuration (11), detection of the temperature increase necessary state of the DOC is stored as the detection information. Thus, this detection information can be used for maintenance or after-sales service, for instance. Further, as described below, even in a case where the DOC temperature increase control is executed when ignition is turned on again after once turned off, the regeneration control device that is rebooted can recognize, through the detection information, that the temperature increase necessary state of the DOC is detected before rebooting.

(12) In some embodiments, in any one of the above configurations (1) to (11), the regeneration control device further includes: a notification part configured to output a regeneration request and thereby notify an operator that the DOC temperature-increase-necessary-state detection part detects the temperature increase necessary state of the DOC; and an execution instruction receiving part configured to receive, from the operator, a response to the regeneration request output from the notification part, as a regeneration execution instruction. The notification part outputs the regeneration request when an ignition key is turned on, and the DOC temperature increase execution part executes the DOC temperature increase control if the execution instruction receiving part receives the regeneration execution instruction.

With the above configuration (12), the DOC temperature increase control is executed from a state where the engine is stopped. Specifically, when the engine is stopped, the application such as a construction machine and a vehicle equipped with the regeneration control device is assumed to be in safe state. Thus, with the notification part, it is possible to execute the DOC temperature increase control after the application is put in the safe state.

Further, the DOC temperature increase control starts after receiving the regeneration execution instruction from the operator. That is, although it is undesirable for some types of the application to execute the DOC temperature increase control immediately when the temperature increase necessary state of the DOC is detected, it is possible to execute the DOC temperature increase control in accordance with the type of the application.

(13) In some embodiments, in the above configuration (12), the notification part issues notification to prompt turning-off of the ignition key when the DOC temperature-increase-necessary-state detection part detects the temperature increase necessary state of the DOC.

With the above configuration (13), it is possible to prompt an operation (turning-off of the ignition key) required for execution of the DOC temperature increase control in a case where the DOC temperature increase control is performed after receiving the regeneration execution instruction from the operator.

(14) In some embodiments, in any one of the above configurations (1) to (11), the regeneration control device further includes: a notification part configured to output a regeneration request and thereby notify an operator that the DOC temperature-increase-necessary-state detection part detects the temperature increase necessary state of the DOC; and an execution instruction receiving part configured to receive, from the operator, a response to the regeneration request output from the notification part, as a regeneration execution instruction. The notification part outputs the regeneration request without waiting for turning-off of an ignition key if the ignition key is not tuned off for a predetermined time after the DOC temperature-increase-necessary-state detection part detects the temperature increase necessary state of the DOC, and the DOC temperature increase execution part executes the DOC temperature increase control if the execution instruction receiving part receives the regeneration execution instruction.

With the above configuration (14), even in a case where the operator is unawares of detection of the temperature increase necessary state of the DOC, or in a case where the engine is continuously operated due to unawareness during operation of the engine, it is possible to reliably execute the DOC temperature increase control after elapse of a predetermined time.

(15) In some embodiments, in any one of the above configurations (1) to (11), the regeneration control device further includes an informing part configured to inform the DOC temperature increase execution part that the DOC temperature-increase-necessary-state detection part detects the temperature increase necessary state of the DOC. The informing part informs the DOC temperature increase execution part of detection of the temperature increase necessary state of the DOC when an ignition key is turned on, and once the DOC temperature increase execution part is informed of detection of the temperature increase necessary state of the DOC by the informing part, the DOC temperature increase execution part automatically executes the DOC temperature increase control.

With the above configuration (15), the DOC temperature increase control is executed from a state where the engine is stopped. Specifically, when the engine is stopped, the application such as a construction machine and a vehicle equipped with the regeneration control device is assumed to be in safe state. Thus, with the notification part, it is possible to execute the DOC temperature increase control after the application is put in the safe state. Moreover, since the DOC temperature increase control is executed in conjunction with ignition-on, it is possible to reduce load on the operator, and it is possible to reliably execute the DOC temperature increase control.

(16) In some embodiments, in any one of the above configurations (1) to (11), the regeneration control device further includes an informing part configured to inform the DOC temperature increase execution part that the DOC temperature-increase-necessary-state detection part detects the temperature increase necessary state of the DOC. The informing part informs the DOC temperature increase execution part of detection of the temperature increase necessary state of the DOC without waiting for turning-off of an ignition key if the ignition key is not tuned off for a predetermined time after the DOC temperature-increase-necessary-state detection part detects the temperature increase necessary state of the DOC, and once the DOC temperature increase execution part is informed of detection of the temperature increase necessary state of the DOC by the informing part, the DOC temperature increase execution part automatically executes the DOC temperature increase control.

With the above configuration (16), when the temperature increase necessary state of the DOC is detected, the DOC temperature increase control is automatically executed after elapse of the predetermined time, without operation by the operator or the like. Thus, it is possible to reliably execute the DOC temperature increase control without waiting for operation of the ignition key by the operator.

(17) In some embodiments, in any one of the above configurations (1) to (11), the regeneration control device further includes an informing part configured to inform the DOC temperature increase execution part that the DOC temperature-increase-necessary-state detection part detects the temperature increase necessary state of the DOC. The informing part informs the DOC temperature increase execution part of detection of the temperature increase necessary state of the DOC if an ignition key is not tuned off for a predetermined time after the DOC temperature-increase-necessary-state detection part detects the temperature increase necessary state of the DOC and further if a temperature increase starting condition is satisfied. Once the DOC temperature increase execution part is informed of detection of the temperature increase necessary state of the DOC by the informing part, the DOC temperature increase execution part automatically executes the DOC temperature increase control. The temperature increase starting condition includes a DOC activation condition including at least one of the following conditions: if an inlet temperature of the DOC or an outlet temperature of the DOC exceeds a predetermined value; or if an operation state of the engine is within a predetermined operation range which permits to increase to the first temperature.

With the above configuration (17), when the temperature increase necessary state of the DOC is detected, the DOC temperature increase control is automatically executed after elapse of the predetermined time, without operation by the operator or the like, if the temperature increase starting condition is satisfied after elapse of the predetermined time. Thus, it is possible to reliably execute the DOC temperature increase control without waiting for operation of the ignition key by the operator. Further, it is determined whether the DOC is to be activated, based on the DOC activation condition, and the DOC temperature increase control is executed when the DOC activation condition (temperature increase starting condition) is satisfied. Thereby, it is possible to efficiently execute the DOC temperature increase control.

(18) In some embodiments, in the above configuration (17), the exhaust gas treatment device includes a DPF disposed in the exhaust passage and downstream of the DOC, the regeneration control device further includes a DPF forced-regeneration-condition determination part configured to determine whether a forced regeneration execution condition for the DPF is satisfied, the temperature increase starting condition further includes the forced regeneration execution condition for the DPF, and the informing part determines that the temperature increase starting condition is satisfied if the DOC activation condition and the forced regeneration execution condition for the DPF are satisfied.

With the above configuration (18), the DOC temperature increase control automatically starts in accordance with the timing of determination that the forced regeneration process of the DPF is necessary. Thus, it is possible to prevent slip of non-combusted fuel or the like upon execution of the forced regeneration process of the DPF after completion of the DOC temperature increase control. Additionally, since the forced regeneration process of the DPF is performed starting from a state where the temperature of the DPF is increased by the DOC temperature increase control, it is possible to efficiently regenerate the exhaust gas treatment device, compared with a case where the forced regeneration of the DPF is performed independently from the removal of substances adhering to the upstream end surface of the DOC.

(19) In some embodiments, in any one of the above configurations (1) to (18), the second temperature is within a range of 380° C. to 480° C.

The inventors have found that, with the above configuration (19), the substance adhering to the upstream end surface of the DOC can be removed by increasing the temperature of the DOC to about 400° C. Thus, by increasing the temperature of the DOC within a range of 380° C. to 480° C., it is possible to reliably and efficiently remove the substances adhering to the upstream end surface of the DOC. Further, for instance, since the DOC is regenerated without heating to the forced regeneration temperature (manual regeneration) of the DPF, it is possible to reduce fuel for regenerating the DOC.

Advantageous Effects

According to at least one embodiment of the present invention, there is provided a regeneration control device whereby it is possible to reliably recover the DOC from the blockage state or the blockage risk state and regenerate the DOC.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
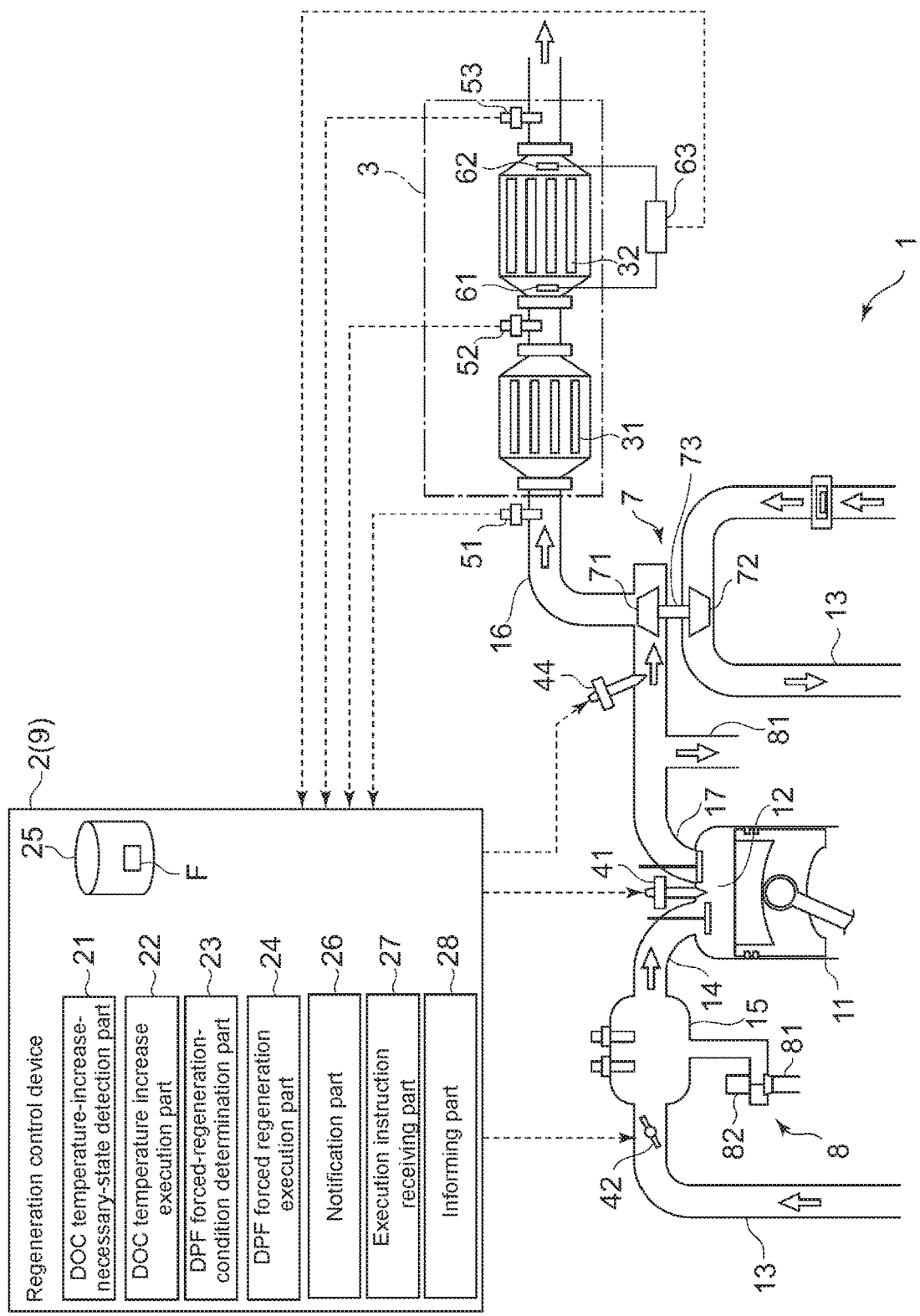
FIG. 1 is an overall configuration diagram of a diesel engine including a regeneration control device with a DOC, according to an embodiment of the present invention.

FIG. 1 is an overall configuration diagram of a diesel engine 1 including a regeneration control device 2 which controls regeneration of an exhaust gas treatment device 3, according to an embodiment of the present invention. The regeneration control device 2 performs regeneration of the exhaust gas treatment device 3 disposed in an exhaust passage 16 of the diesel engine 1 by controlling a temperature increase unit 4 of the exhaust gas treatment device 3. First, the diesel engine 1 (hereinafter, also referred to as engine 1) shown in FIG. 1 will be described. The diesel engine 1 of FIG. 1 mainly includes an engine body 11, an intake passage 13, an exhaust passage 16, an exhaust turbocharger 7, an EGR device 8, and an ECU 9, in addition to the regeneration control device 2 and the exhaust gas treatment device 3 described above.

To the engine body 11, the intake passage 13 and the exhaust passage 16 are connected. The intake passage 13 is a passage for supplying air outside the engine 1 (intake air) to a combustion chamber 12 formed in the engine body 11. The exhaust passage 16 is a passage for discharging combustion gas (exhaust gas) from the combustion chamber 12 to the outside of the engine 1. Further, the engine 1 includes a fuel injection device 41 for injecting high-pressure fuel to the combustion chamber 12. The fuel injection device 41 is connected to a common rail (not shown) accumulating the high-pressure fuel, and the ECU 9 described below controls the injection timing and the fuel injection amount of the fuel injection device 41. The high-pressure fuel injected into the combustion chamber 12 is mixed with intake air that is supplied through the intake passage 13, combusted in the combustion chamber 12, and is discharged out of the engine 1 through the exhaust passage 16.

In the example shown in FIG. 1, the exhaust turbocharger 7 is disposed in the intake passage 13 and the exhaust passage 16. The exhaust turbocharger 7 includes an exhaust turbine 71 disposed in the exhaust passage 16 and a compressor 72 disposed in the intake passage 13, and the exhaust turbine 71 and the compressor 72 are coupled via a shaft 73 coaxially. Further, as exhaust gas passing through the exhaust passage 16 rotary drives the exhaust turbine 71, the compressor 72 coaxially coupled to the exhaust turbine 71 via the shaft 73 is also rotary driven. Further, an inter cooler (not shown) and a throttle valve 42 are disposed in the intake passage 13. The inter cooler (not shown) cools the compressed intake air discharged from the compressor 72, then the throttle valve 42 controls the intake flow rate, and then the compressed intake air flows into the combustion chamber 12 of each cylinder of the engine 1 via an intake port 14 disposed on the body (cylinder head, although not shown) of the engine 1. The opening degree of the throttle valve 42 is controlled by the ECU 9 described below.

Further, in the example shown in FIG. 1, the engine 1 includes an EGR device 8. Specifically, the intake passage 13 and the exhaust passage 16 are coupled via an EGR pipe 81 so as to allows a part of exhaust gas flowing through the exhaust passage 16 to be recirculated to the intake passage 13. In the example shown in FIG. 1, one end of the EGR pipe 81 is connected to an immediately downstream position of an exhaust port 17, and the EGR pipe 81 branches from the exhaust passage 16. Further, the other end of the EGR pipe 81 is connected to an intake manifold 15 (intake passage 13) disposed on the downstream side of the throttle valve 42. Further, an EGR valve 82 is disposed in the EGR pipe 81. By controlling the EGR valve 82, a part of exhaust gas discharged from the engine 1 flows through the EGR pipe 81 and recirculates through the engine 1. The opening degree of the EGR valve 82 is also controlled by the ECU 9 described below.

The ECU 9 is an electronic control unit which controls the engine 1. For instance, the ECU 9 may be configured as a microcomputer composed of a central processing unit (CPU) including a processor, a random access memory (RAM), a read only memory (ROM), and an I/O interface.

As described above, in the example shown in FIG. 1, exhaust gas discharged from the engine body 11 (combustion chamber 12) drives the exhaust turbine 71 described above and then flows into the exhaust gas treatment device 3 disposed in the exhaust passage 16.

In some embodiments, as in the embodiment shown in FIG. 1, the exhaust gas treatment device 3 includes a diesel oxidation catalyst (DOC) 31 disposed in the exhaust passage 16 of the diesel engine 1. In some embodiments, the exhaust gas treatment device 3 may further include another component, downstream of the DOC 31, for treating exhaust gas. In some embodiments, as in the embodiment shown in FIG. 1, the exhaust gas treatment device 3 includes a diesel oxidation catalyst (DOC) 31 disposed in the exhaust passage 16 of the diesel engine 1, and a diesel particulate filter (DPF) 32 disposed in the exhaust passage 16 downstream of the DOC 31.

The DOC 31 has a function to oxidize and remove non-combusted fuel (HC) and carbon monoxide (CO) from exhaust gas and to oxidize nitrogen monoxide (NO) in the exhaust gas to produce nitrogen dioxide ($NO_2$). In a case where the exhaust gas treatment device 3 includes the DPF 32 downstream of the DOC 31, the DOC 31 increases the temperature of passing exhaust gas with oxidation heat of injected fuel to increase the inlet temperature of the DPF 32. The DPF 32 is a device which collects particulate matters (PM), such as soot, contained in exhaust gas with a filter to remove the particulate matters from exhaust gas. That is, exhaust gas after flowing into the exhaust gas treatment device 3 passes through the DOC 31 inside the exhaust gas treatment device 3, and then passes through the DPF 32. Upon this passage, the DOC 31 oxidizes and removes non-combusted fuel (HC) and carbon monoxide (CO) from exhaust gas. Further, in a case where the exhaust gas treatment device 3 includes the DPF 32, the DPF 32 collects PM (particulate matters) contained in exhaust gas, thereby removing PM from exhaust gas. Then, exhaust gas is discharged out of the engine 1.

If the operation load of the engine 1 and the exhaust gas temperature are low continuously, SOF or soot of non-combusted fuel or the like in exhaust gas passing through the exhaust gas treatment device 3 adheres to an upstream end surface of the DOC 31, and blockage of the DOC gradually progresses. Further, blockage of the DOC 31 causes the above-described problems such as deterioration in the fuel efficiency due to an increase in the exhaust pressure. Further, in a case where the exhaust gas treatment device 3 includes the DPF 32, upon execution of forced regeneration of the DPF 32, the fuel efficiency may deteriorate due to injection of an excess amount of fuel that is injected to increase the inlet temperature of the DPF 32 to a predetermined temperature. Furthermore, blockage of the DOC 31 may cause slip of non-combusted fuel which may raise the risk of burn damage of the DPF 32, and may increase the risk of oil dilution when the temperature increases due to late-post injection described below.

Such problems are raised by substances adhering to the DOC 31 which cause blockage of the DOC 31. The substances can be removed by increasing the temperature of the DOC 31. Therefore, for recovering (regenerating) the DOC 31 from a temperature increase necessary state, the regeneration control device 2 controls the temperature increase unit 4 (described below) to increase the temperature of the DOC 31 in the temperature increase necessary state D and to regenerate the DOC 31 (DOC blockage recovery regeneration).

For the DOC blockage recovery regeneration, the regeneration control device 2 monitors the state of exhaust gas or the state of the exhaust gas treatment device 3 on the basis of detection values from various sensors disposed in the exhaust passage 16. In the example shown in FIG. 1, a DOC inlet temperature sensor 51 is disposed on the inlet of the DOC 31, to detect the temperature of exhaust gas flowing into the DOC 31. Further, various sensors are disposed in the exhaust passage 16, including temperature sensors 5 such as a DPF inlet temperature sensor 52 disposed on the inlet of the DPF 32 (between the DOC 31 and the DPF 32) and a DPF outlet temperature sensor 53 disposed on the outlet of the DPF 32, and pressure sensors 6 such as a DPF inlet pressure sensor 61 disposed on the inlet of the DPF 32, a DPF outlet pressure sensor 62 disposed on the outlet of the DPF 32, and a DPF differential-pressure sensor 63 capable of detecting the differential pressure between the inlet and the outlet of the DPF 32. The detection values from the sensors are input into the regeneration control device 2 and used for determination of whether the DOC 31 is in the temperature increase necessary state D or not, or for DOC temperature increase control Rc, or for forced regeneration process Rf (described below) of the DPF 32.

Further, as shown in FIG. 1, the regeneration control device 2 includes a DOC temperature-increase-necessary-state detection part 21 and a temperature increase execution part 22 for performing the DOC blockage recovery regeneration control. That is, the DOC blockage recovery regeneration control is performed with cooperation between the DOC temperature-increase-necessary-state detection part 21 and the temperature increase execution part 22. In the embodiment shown in FIG. 1, the regeneration control device 2 is an ECU 9 and is implemented as one of functions (program or circuits) of the ECU 9. Alternatively, in some embodiments, the regeneration control device 2 may be configured as an electronic control unit including a processor, independently from the ECU 9 for controlling the engine 1.

The DOC temperature-increase-necessary-state detection part 21 detects the temperature increase necessary state D including at least one of a blockage state D1 of the DOC 31 or a blockage risk state D2 of the DOC 31. The blockage state D1 of the DOC 31 is a state where the DOC 31 is blocked and requires recovery process (DOC temperature increase control Rc). This state is detected on the basis of comparison between a blockage parameter P related to blockage of the DOC 31 and a predetermined blockage threshold. The blockage state D1 of the DOC 31 can be detected by various methods as described below. As shown in FIG. 1, in a case where the exhaust gas treatment device 3 includes the DOC 31 and the DPF 32, for instance, the blockage parameter P may be the outlet temperature of the DPF 32. In the example shown in FIG. 1, the outlet temperature of the DPF 32 is determined on the basis of a detection value of the DPF outlet temperature sensor 53. Thus, using the outlet temperature of the DPF 32 as the blockage parameter P, the temperature increase necessary state of the DOC can be easily and accurately detected with an existing sensor. In other embodiments, the blockage state D1 of the DOC 31 may be directly monitored. For instance, the blockage parameter P may be the outlet temperature of the DOC 31 (detection value of the DPF inlet temperature sensor 52) or may be the differential pressure between the inlet and the outlet of the DOC 31.

Meanwhile, the blockage risk state D2 of the DOC 31 is a state where blockage of the DOC 31 is presumed to be likely occur, on the basis of the operation state of the engine 1. This state is detected when the diesel engine 1 is in an operation state that is likely to cause blockage of the DOC 31. The blockage risk state D2 of the DOC 31 can also be detected by various methods as described below. In some embodiments, during normal operation where forced regeneration process Rf of the DPF 32 is not executed, the DOC temperature-increase-necessary-state detection part 21 detects the blockage risk state D2 of the DOC 31 if an accumulated duration time within a latest predetermined period of the low exhaust temperature operation state, where exhaust gas temperature is lower than the exhaust temperature threshold, exceeds a predetermined threshold, regardless of the presence of DPF 32. In other embodiments, it may be detected that the DOC 31 is in the blockage risk state D2 if one or more of the following conditions are satisfied: during normal operation, if the temperature of exhaust gas is continuously not greater than a predetermined temperature for at least a predetermined time; if the number of times that the change rate of the engine rotation speed of the engine 1 exceeds a predetermined rotation-speed threshold per unit time continuously exceeds a threshold for at least a predetermined time; and if the average of a PM discharge-amount estimate value is continuously not less than a threshold for at least a predetermined time. In still other embodiments, it may be detected that the DOC 31 is in the blockage risk state if one or more of the above-described determination methods are satisfied.

If the exhaust gas temperature is continuously lower than the exhaust temperature threshold, that is, if the low exhaust temperature operation state continues, blockage of the DOC 31 develops gradually. On the other hand, once the exhaust gas temperature exceeds the exhaust temperature threshold, that is, enters the high exhaust temperature operation state, blockage of the DOC 31 starts to be removed. Thus, with the above configuration, since the blockage risk state D2 of the DOC 31 is detected with the accumulated duration time of the low exhaust temperature operation state within a latest predetermined period, it is possible to accurately detect the blockage risk state D2 of the DOC 31. Further, it is possible to prevent blockage (blockage state D1) of the DOC 31 in advance.

Meanwhile, the temperature increase execution part 22 performs the DOC temperature increase control Rc if the temperature increase necessary state D of the DOC 31 is detected. The DOC temperature increase control Rc includes a first temperature increase process Rc1 and a second temperature increase process Rc2. The first temperature increase process Rc1 is to control the temperature increase unit 4 (described below) to increase the temperature of the DOC 31 to a first temperature T1 at which the DOC 31 activates. The second temperature increase process Rc2 is to control the temperature increase unit 4 (described below) to increase the temperature of the DOC 31 to a second temperature T2 higher than the first temperature T1, after completion of the first temperature increase process Rc1. That is, the temperature increase execution part 22 does not increase the temperature of the DOC 31 at once to the second temperature T2, from the start of the DOC temperature increase control Rc. Instead, the temperature increase execution part 22 first activates the DOC 31 by the first temperature increase process Rc1 and then increases the temperature of the DOC 31 to the second temperature T2 by the second temperature increase process Rc2. As the DOC 31 is heated from the first temperature T1 to the second temperature T2, substances adhering to the DOC 31 are combusted and removed from the DOC 31. As described above, by increasing the temperature of the DOC 31 in two stages, it is possible to prevent progress of the blockage state D1 of the DOC due to fuel injected to heat the DOC 31 to the second temperature T2 before activation of the DOC 31, while suppressing discharge of HC.

Figure 2:
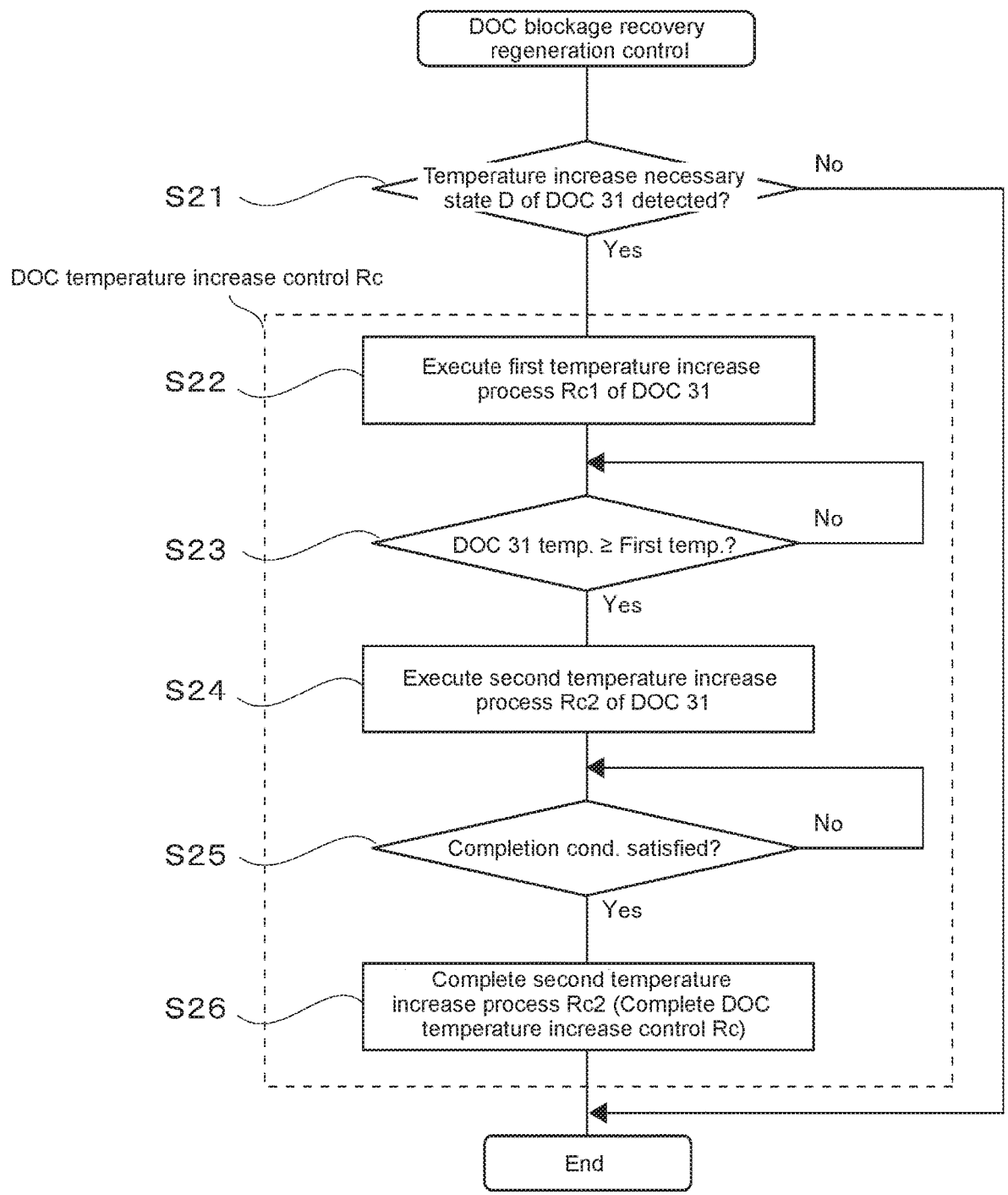
FIG. 2 is a flowchart of DOC blockage recovery regeneration control for an exhaust gas treatment device, using a regeneration control device according to an embodiment of the present invention.
Figure 3:
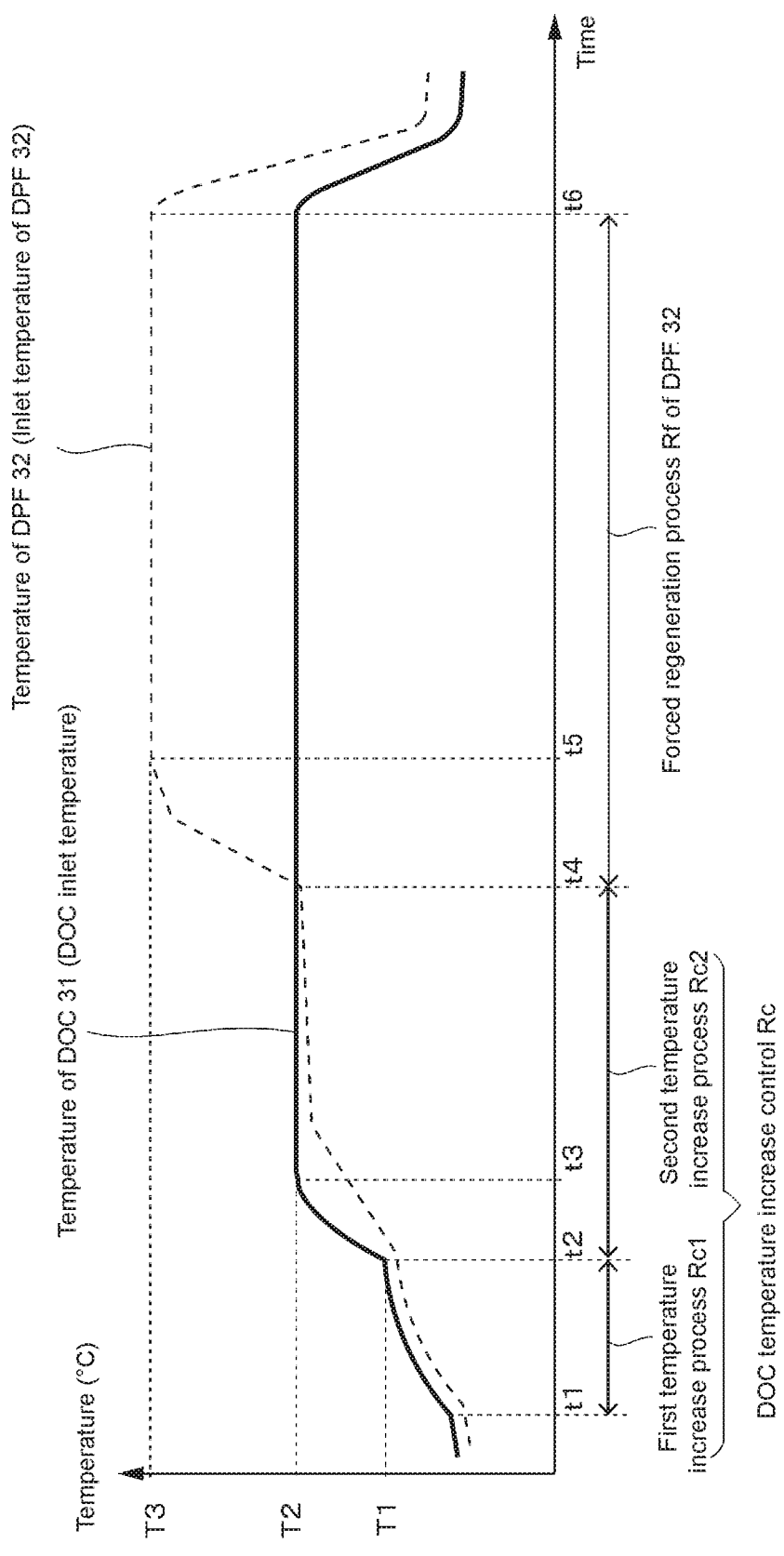
FIG. 3 is a time chart of DOC temperature increase control according to an embodiment of the present invention.

Next, the DOC blockage recovery regeneration control for the DOC 31 using the regeneration control device 2 will be described with reference to FIGS. 2 and 3. FIG. 2 is a flowchart of DOC blockage recovery regeneration control for the exhaust gas treatment device 3, using the regeneration control device 2 according to an embodiment of the present invention. FIG. 3 is a time chart of DOC temperature increase control Rc according to an embodiment of the present invention. In the example shown in FIG. 3, the temperature of the DOC 31 is detected on the basis of a detection value of the DOC inlet temperature sensor 51, and the temperature of the DPF 32 is detected on the basis of a detection value of the DPF inlet temperature sensor 52.

In step S21 of FIG. 2, the temperature increase necessary state D is monitored. The monitoring of the temperature increase necessary state D may be performed periodically, or may be performed at a predetermined timing, for instance, during execution of forced regeneration process Rf of the DPF 32 if the device includes the DPF 32 as described below. The temperature increase necessary state D indicates the blockage state D1 of the DOC 31 or the blockage risk state D2 of the DOC 31, as described above. Then, in step S21, if the temperature increase necessary state D is not detected, the flowchart of FIG. 2 ends. Conversely, if the temperature increase necessary state D is detected in step S21, the first temperature increase process Rc1 is executed in step S22. In the time chart shown in FIG. 3, the first temperature increase process Rc1 starts at time t1. Accordingly, the temperature increase rate of the DOC 31 changes and increases at time t1, and the temperature of the DOC 31 starts to increase through the first temperature increase process Rc1.

In step S23 of FIG. 2, it is monitored whether the DOC 31 reaches the first temperature T1 by the first temperature increase process Rc1. When the temperature of the DOC 31 reaches the first temperature T1, the first temperature increase process Rc1 is completed. Then, the second temperature increase process Rc2 is executed in step S24. In the time chart shown in FIG. 3, the temperature of the DOC 31 reaches the first temperature at time t2, and thus the first temperature increase process Rc1 is completed at time t2. Further, at time t2, the second temperature increase process Rc2 starts. Accordingly, the temperature increase rate of the DOC 31 changes and increases at time t2. The temperature of the DOC 31 further increases at time t2 from the first temperature T1. The temperature of the DOC 31 reaches the second temperature T2 at time t3.

In step S25 of FIG. 2, after start of the second temperature increase process Rc2, it is monitored whether the completion condition of the second temperature increase process Rc2 is satisfied. If the completion condition of the second temperature increase process Rc2 is satisfied, the second temperature increase process Rc2 is completed in step S26, and the DOC temperature increase control Rc is completed.

In the time chart shown in FIG. 3, the completion condition of the second temperature increase process Rc2 is satisfied at time t4.

The completion condition of the second temperature increase process Rc2 is set in order to have the DOC 31 at a temperature (second temperature T2) for combusting deposits on the DOC 31 for a predetermined time. In some embodiments, the DOC temperature increase control Rc may be configured to be completed after elapse of a predetermined time after start of the second temperature increase process Rc2, or after elapse of a predetermined time after the second temperature increase process Rc2 starts and reaches the second temperature T2. The predetermined time may be, for instance, 20 minutes or longer after arriving at the second temperature T2. Further, the time may be set in accordance with the amount of deposits on the DOC 31 to be removed by the DOC temperature increase control Rc (e.g. map). Thereby, it is possible to have the DOC 31 at the second temperature T2, at which substances adhering to the DOC 31 can be combusted, for a predetermined time, and to regenerate the DOC 31 from the temperature increase necessary state D. Further, in some embodiments, the second temperature increase process Rc2 may be configured to be completed after elapse of a predetermined time after arriving at a temperature lower than the second temperature T2 by a predetermined temperature (e.g., 10° C. or lower).

In the time chart shown in FIG. 3, after the temperature of the DOC 31 reaches the second temperature T2 (after time t3), the temperature of the DOC 31 is retained at a fixed temperature. However, the temperature may increase or decrease after reaching the second temperature T2. Further, while in the example shown in FIG. 3, forced regeneration process Rf described below is executed after completion of the second temperature increase process Rc2, the invention is not limited thereto. The temperature of the DOC 31 may decrease gradually.

The second temperature T2 is preferably about 400° C. More specifically, the second temperature T2 may be within a range of 380° C. to 480° C. This temperature range of the second temperature T2 is set based on a new finding that substances adhering to the upstream end surface of the DOC 31 burn when the DOC 31 is heated to the second temperature T2 in this range.

With the above configuration, when the temperature increase necessary state D of the DOC is detected, the temperature increase process Rc is executed in two stages: the first temperature increase process Rc1 for activating the DOC 31; and then the second temperature increase process Rc2 for removing substances adhering to the upstream end surface of the DOC 31. By executing the second temperature increase process Rc2 after activation of the DOC 31 through the first temperature increase process Rc1, it is possible to prevent progress of blockage of the DOC 31 due to fuel used for heating, while suppressing discharge of HC. Moreover, heating the DOC 31 activated by the first temperature increase process Rc1 to the second temperature T2 (about 400° C.) enables removal of substances adhering to the upstream end surface of the DOC 31 while preventing progress of blockage (blockage state D1, blockage risk state D2) of the DOC 31. Thus, it is possible to regenerate the DOC 31 from the temperature increase necessary state D.

Further, with the above configuration, it is possible to expose the DOC 31 in the temperature increase necessary state D to the second temperature T2, at which substances adhering to the DOC 31 can be combusted, for a predetermined time, and to regenerate the DOC 31 from the temperature increase necessary state D. Further, since not only the blockage state D1 but also the blockage risk state D2 is detected as the temperature increase necessary state D, it is possible to prevent blockage (blockage state D1) of the DOC 31 in advance.

Further, the inventors have found that the substance adhering to the upstream end surface can be removed by increasing the temperature of the DOC 31 to about 400° C. Thus, by increasing the temperature of the DOC 31 within a range of 380° C. to 480° C., it is possible to reliably and efficiently remove the substances adhering to the upstream end surface of the DOC 31. Further, for instance, since the DOC 31 is regenerated without heating to the forced regeneration temperature (manual regeneration) of the DPF, it is possible to reduce fuel for regenerating the DOC 31.

In the embodiment shown in FIG. 1, as illustrated in FIG. 1, the temperature increase unit 4 is composed of a fuel injection device 41 for injecting fuel to the combustion chamber 12 of the diesel engine 1. Further, the first temperature increase process Rc1 and the second temperature increase process Rc2 are executed by early-post injection with the fuel injection device 41. The early-post injection is the first post injection of injecting a smaller amount of fuel than main injection while the pressure in the combustion chamber 12 is still high immediately after injection of the main fuel, in the step of injecting fuel to the engine 1 (see FIG. 4). The early-post injection makes it possible to increase the exhaust-gas temperature without affecting the output of the diesel engine 1.

Further, the first temperature increase process Rc1 and the second temperature increase process Rc2 have different fuel injection conditions for the early post injection. With the injection condition of the first temperature increase process Rc1 being switched to the injection condition of the second temperature increase process Rc2, the DOC 31 heated to the first temperature T1 is further heated to the second temperature T2. More specifically, the fuel injection amount is greater in the second temperature increase process Rc2 than in the first temperature increase process Rc1, or the injection timing varies between the first temperature increase process Rc1 and the second temperature increase process Rc2, or the fuel injection amount is greater in the second temperature increase process Rc2 than in the first temperature increase process Rc1 and the injection timing varies between the first temperature increase process Rc1 and the second temperature increase process Rc2. That is, the first temperature increase process Rc1 and the second temperature increase process Rc2 have different injection conditions in terms of at least one of the fuel injection amount or the injection timing.

With the above configuration, by changing the injection amount or the injection timing for the early-post injection with the fuel injection device 41, it is possible to easily execute the first temperature increase process Rc1 and the second temperature increase process Rc2. Further, the first temperature increase process Rc1 and the second temperature increase process Rc2 both can be executed by the fuel injection device 41, which is usually provided to the engine 1. This eliminates the necessity of an additional temperature increase unit 4, reduces adjustment parameters, shortens the calibration time for optimization, and reduces the cost.

In some embodiments, the temperature increase unit 4 for executing the DOC temperature increase control Rc may be a throttle valve 42 or a common rail pressure controller (not shown) for controlling the common rail pressure for injecting fuel. In some embodiments, the temperature increase unit 4 may be at least one of the fuel injection device 41, the throttle valve 42, or the common rail pressure controller (not shown) and may execute the first temperature increase process Rc1 and the second temperature increase process Rc2 by switching at least one of the injection conditions, the opening degree of the throttle valve 42, or the common rail pressure. Thereby, it is possible to execute the DOC temperature increase control Rc under optimum conditions in terms of fuel consumption, cost, and easiness of control.

Hereinafter, assuming that the exhaust gas treatment device 3 includes the DOC 31 and the DPF 32 disposed downstream of the DOC 31, the regeneration control device 2 for controlling regeneration of the exhaust gas treatment device 3 will be described. That is, forced regeneration is performed on the DPF 32.

In some embodiments, as shown in FIG. 1, the exhaust gas treatment device 3 further includes the DPF 32 disposed in the exhaust passage 16 downstream of the DOC 31. Further, the regeneration control device 2 further includes a DPF forced regeneration execution part 24 which executes forced regeneration process Rf to control the temperature increase unit 4 so as to increase the temperature of the DPF 32 to a third temperature T3 (see FIG. 1). The second temperature T2 is higher than the first temperature T1 and lower than the third temperature T3 (first temperature T1<second temperature T2<third temperature T3).

The forced regeneration of the DPF 32 will be described. As described above, when exhaust gas passes through the exhaust gas treatment device 3, particulate matters (PM) contained in exhaust gas is collected by the DPF 32. If exhaust gas discharged from the engine body 11 (combustion chamber 12) under operation has a high temperature, PM collected by the DPF 32 is combusted by the high-temperature exhaust gas, and is removed naturally (natural regeneration). However, PM that has not been removed by natural regeneration accumulates on the filter of the DPF. Excessive accumulation of PM may bring about a decrease in the PM collecting performance and a decrease in the engine output, for instance. Thus, in the exhaust gas treatment device 3 including the DPF 32, forced regeneration process Rf is performed at an appropriate timing to combust PM that accumulates on the filter of the DPF 32 forcedly. This forced regeneration process Rf can be classified into at least two types, by its starting trigger. Namely, there are at least two types of forced regeneration: automatic regeneration executed automatically; and manual regeneration executed manually by an operator or the like.

The automatic regeneration of the DPF 32 is automatically executed if predetermined forced-regeneration execution conditions (automatic regeneration execution conditions) related to the automatic regeneration are satisfied, regardless of whether the vehicle is moving or standing. The automatic regeneration execution conditions may include, for instance: an estimate value of the PM accumulation amount on the DPF 32 exceeding a predetermined value (threshold); the operation time of the engine 1 exceeding a predetermined period of time (threshold); and an accumulated fuel injection amount of the engine 1 exceeding a predetermined amount (threshold). The PM accumulation amount on the DPF 32 can be estimated by detecting a differential pressure between the upstream and downstream sides of the DPF 32 with the DPF differential-pressure sensor 63, for instance. Alternatively, the PM accumulation amount can be estimated by detecting the engine rotation speed, the fuel injection amount, the air flow rate, or the DPF temperature (e.g., detection value of the DPF outlet temperature sensor 53), estimating the PM regeneration amount inside the DPF 32 by natural regeneration and the PM discharge amount from the engine 1 on the basis of a map stored in advance in the regeneration control device 2, and subtracting the PM regeneration amount from the PM discharge amount.

Meanwhile, the manual regeneration of the DPF 32 is executed by, for instance, button operation of an operator or the like being a forced regeneration execution condition (manual regeneration execution condition), basically while the vehicle is standing. The manual regeneration execution condition is performed if PM is accumulated over the automatic regeneration condition, including a case where the estimate value of the PM accumulation amount exceeds a predetermined value that is greater than that in automatic regeneration. Further, the manual regeneration may include combustion removal by a maintenance personnel at the time when PM is accumulated on the DPF 32 excessively (DPF recovery regeneration). In this case (DPF recovery regeneration), forced regeneration is performed for a longer period of time than for normal manual regeneration, to avoid an excessive temperature increase of the DPF 32. Further, the two types of regenerations also differ in terms of the temperature upon execution of forced regeneration; the regeneration temperature is higher in the manual regeneration than in the automatic regeneration. For example, the inlet temperature of the DPF 32 is controlled to be 600° C. to 610° C. in the automatic regeneration, and is controlled to be 620° C. to 630° C. in the manual regeneration. As described above, the second temperature T2 (e.g., 400° C.) is lower than the third temperature T3 (e.g., 600° C. or higher).

In the above configuration, the second temperature T2 (e.g., 400° C.) which the DOC 31 reaches by the second temperature increase process Rc2 is lower than the forced regeneration temperature (e.g., 600° C.) of the DPF 32. Thus, it is possible to reduce fuel for regenerating the DOC 31 from the temperature increase necessary state D such as the blockage state D1, and improve the fuel efficiency.

Figure 4:
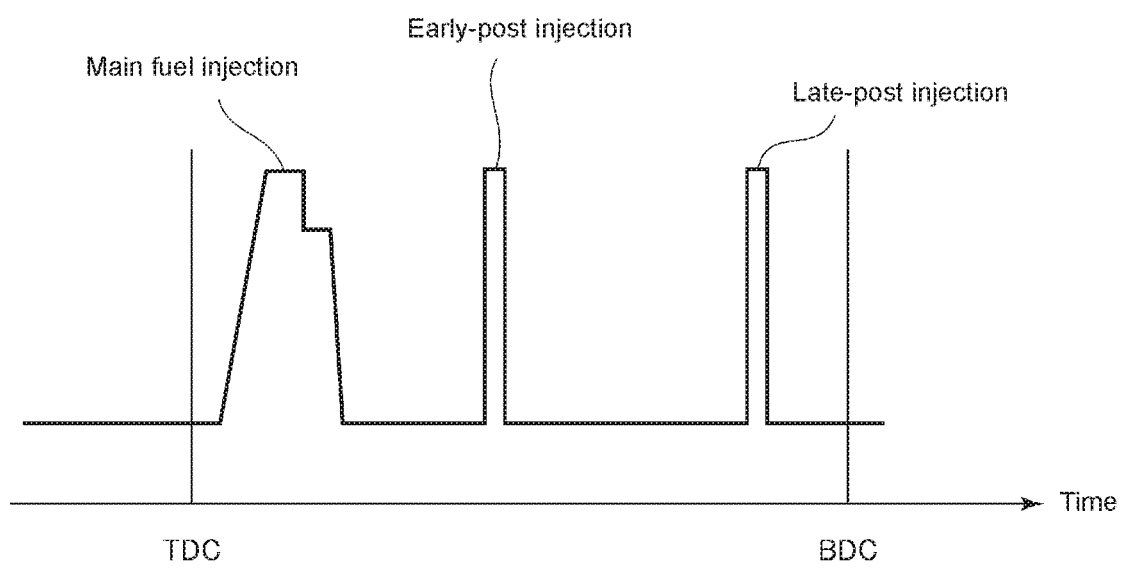
FIG. 4 is a diagram for describing forced regeneration process of a DPF performed by early-post injection and late-post injection according to an embodiment of the present invention.

The forced regeneration process Rf by the DPF forced regeneration execution part 24 will be described in detail. In some embodiments, the temperature increase unit 4 is configured of a fuel injection device 41 which injects fuel to the combustion chamber 12 of the diesel engine 1, and the forced regeneration process Rf is executed by early-post injection with the fuel injection device 41 and by late-post injection with the fuel injection device 41 or exhaust pipe injection with an exhaust pipe injection device 44 disposed in the exhaust passage 16 on the upstream side of the DOC 31. FIG. 4 illustrates a case where the forced regeneration process Rf is executed by early-post injection and late-post injection.

FIG. 4 is a diagram for describing forced regeneration process of the DPF performed by early-post injection and late-post injection according to an embodiment of the present invention. The late-post injection is the second post injection injecting fuel at a timing (in the vicinity of the bottom dead center) that does not contribute to combustion inside the combustion chamber 12 after the early-post injection. In the example shown in FIG. 4, while the piston disposed on the engine body 11 moves from the top dead center (TDC) to the bottom dead center (BDC), the main fuel injection is performed after passing the top dead center, and then the early post injection is performed. Then, after the early post injection and before the piston reaches the bottom dead center (BDC) from the top dead center (TDC), the late post injection is performed. The late-post injection causes non-combusted fuel to flow out from the combustion chamber 12 into the exhaust passage 16, and the discharged non-combusted fuel is oxidized by the DOC 31 to increase the temperature of the DPF 32 to the third temperature T3. Further, by increasing the temperature of the DPF 32 to the third temperature T3, it is possible to combust the PM accumulated on the DPF 32.

On the other hand, in a case where the exhaust pipe injection is used for the forced regeneration process Rf, the forced regeneration process Rf may be executed, instead of the late post injection, or along with the late post injection, through the exhaust pipe injection. In the example shown in FIG. 1, the exhaust pipe injection device 44 is disposed between a downstream position of the branch position of the EGR pipe 81 and the exhaust turbine 71 of the exhaust turbocharger 7. In other embodiments, the exhaust pipe injection device 44 may be disposed between the exhaust turbine 71 and the DOC 31. Further, the fuel injection amount to be injected from the exhaust pipe injection device 44 to the exhaust passage 16 is controlled by the regeneration control device 2.

In some embodiments, as shown in FIG. 3, the forced regeneration process Rf of DPF 32 is executed after completion of the DOC temperature increase control Rc. In the example shown in FIG. 3, the DOC temperature increase control Rc is completed at time t4, and as the temperatures of the DOC 31 and the DPF 32 are increased to around the second temperature T2, the forced regeneration process Rf of the DPF 32 is executed. Further, the temperature of the DPF 32 is increased to the third temperature T3 at time t5. In other embodiments, the forced regeneration process Rf of the DPF 32 is performed solely and independently from the DOC temperature increase control Rc. In this case, in the forced regeneration process Rf of the DPF 32, firstly, the temperature of the DPF 32 is increased to the first temperature T1 or higher to activate the DPF 32. Specifically, the fuel injection device 41 may be used as the temperature increase unit 4 to increase the temperature by early-post injection under a predetermined injection condition. Alternatively, the throttle valve 42 may be used as the temperature increase unit 4, and the process may be executed by controlling the opening degree of the throttle valve 42. Further, the common rail pressure controller (not shown) which controls the common rail pressure for injecting fuel may be used as the temperature increase unit 4, and the process may be executed by controlling the common rail pressure. Two or more of the fuel injection device 41, the throttle valve 42, or the common rail pressure controller (not shown) may be used as the temperature increase unit. Then, the forced regeneration process Rf of the DPF 32 is executed using late-post injection or exhaust pipe injection, as is performed after the DOC temperature increase control Rc described above, to increase the temperature of the DPF 32 to the third temperature T3.

With the above configuration, it is possible to perform the forced regeneration process Rf of the DPF 32 using the fuel injection device 41 or the exhaust pipe injection device 44. Further, in a case where the temperature increase unit 4 in the DOC temperature increase control Rc is the fuel injection device 41, it is possible to easily perform the DOC temperature increase control Rc and the forced regeneration process Rf of the DPF 32 by the fuel injection device 41. Further, since the engine 1 is usually equipped with the fuel injection device 41, it is unnecessary to provide an additional temperature increase unit 4, and thus it is possible to reduce the cost.

Alternatively, in some embodiments, as shown in FIG. 3, the forced regeneration process Rf (automatic regeneration or manual regeneration) of DPF 32 may be executed continuously after completion of the DOC temperature increase control Rc. First, the time chart shown in FIG. 3 will be described. In the example shown in FIG. 3, once the DOC temperature increase control Rc is completed at time t4, the forced regeneration process Rf of the DPF 32 is started. Further, by the forced regeneration process Rf of the DPF 32, the temperature increase rate of the DPF 32 changes in an increasing direction, and the temperature of the DPF 32 reaches the third temperature T3, which is the forced regeneration temperature, at time t5. Then, the temperature increase unit 4 is controlled to keep the third temperature T3. On the other hand, the DOC 31 is controlled to be kept at the second temperature T2 from the time t4 when the DOC temperature increase control Rc is completed. Further, the forced regeneration process Rf is completed at time t6, and after time t6, the temperature of the DOC 31 and the temperature of the DPF 32 decrease gradually over time. While in the example shown in FIG. 3, the temperature of the DOC 31 is controlled to be kept at the second temperature T2, in some embodiments, the temperature of the DOC 31 may be controlled to be kept at the first temperature T1 or higher.

Figure 5:
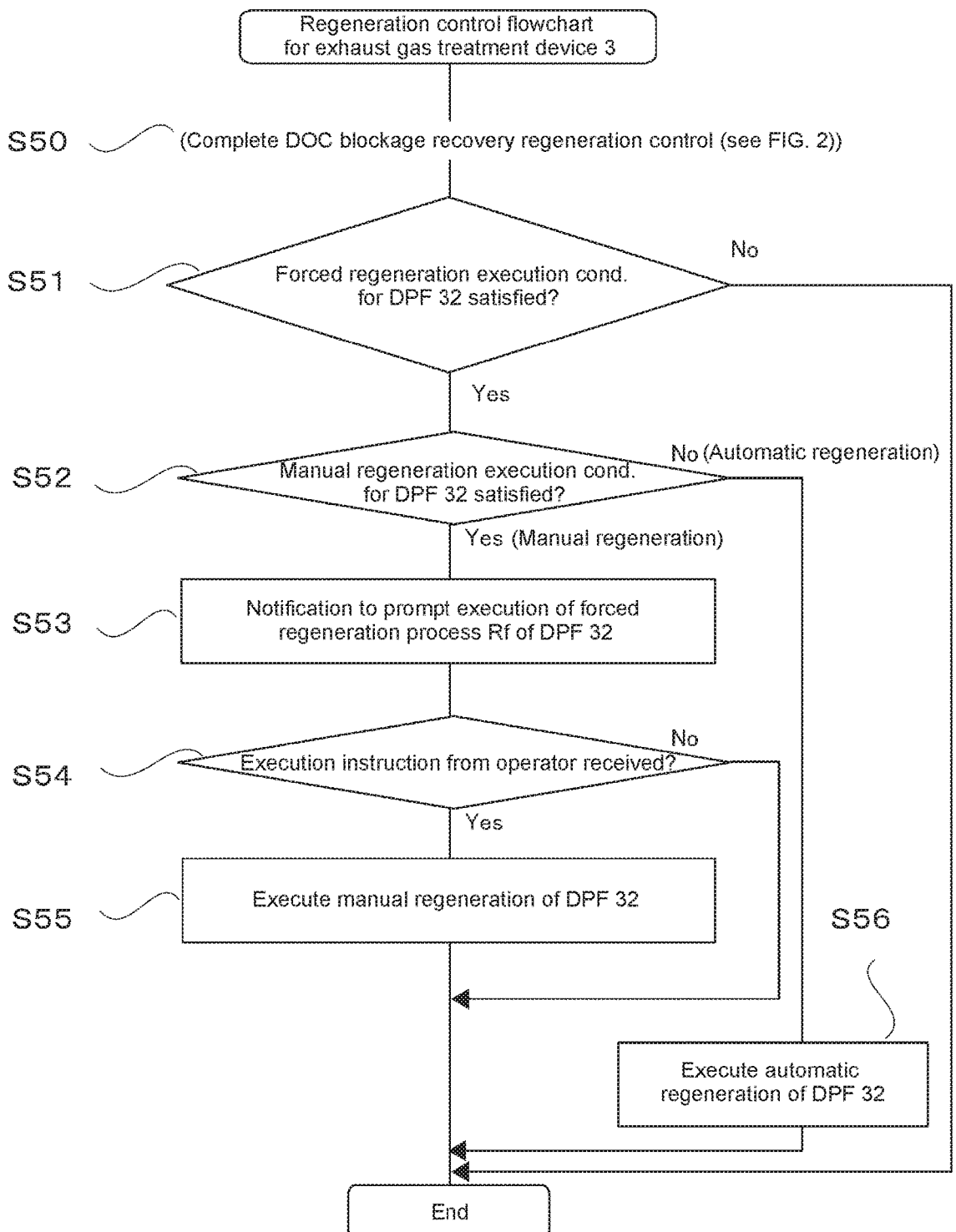
FIG. 5 is a flowchart of regeneration control for an exhaust gas treatment device including a DOC and a DPF according to an embodiment of the present invention, which shows a case where a forced regeneration execution condition for the DPF is confirmed.

The regeneration control device 2 has a configuration for performing control as shown in FIG. 3. In some embodiments, as shown in FIG. 1, the regeneration control device 2 further includes a DPF forced-regeneration-condition determination part 23 which determines whether a forced regeneration execution condition for the DPF 31 is satisfied. When the second temperature increase process Rc2 is completed, if the DPF forced-regeneration-condition determination part 23 determines that the forced regeneration execution condition is satisfied, the DPF forced regeneration execution part 24 executes the forced regeneration process Rf automatically (automatic regeneration of DPF 32) or issues notification to prompt execution of the forced regeneration process Rf (manual regeneration of DPF 32), after completion of the DOC temperature increase control Rc. More specifically, as shown in FIG. 5, the regeneration control device 2 continuously executes the forced regeneration process Rf if the forced regeneration execution condition for the DPF 32 is satisfied after completion of the DOC temperature increase control Rc. FIG. 5 is a flowchart of regeneration control for the exhaust gas treatment device 3 including the DOC 31 and the DPF 32 according to an embodiment of the present invention, which shows a case where the forced regeneration execution condition for the DPF 32 is confirmed. In step S50 of FIG. 5, the DOC temperature increase control Rc has been completed.

In step S51 of FIG. 5, after completion of the DOC temperature increase control Rc, it is confirmed whether the forced regeneration execution condition for the DOC 32 is satisfied. In step S51, if it is determined that the forced regeneration execution condition is not satisfied, the flowchart ends. Conversely, in step S51, if it is determined that the forced regeneration execution condition is satisfied, in step S52, it is confirmed whether a manual regeneration condition for the DPF 32 is satisfied. If the manual regeneration condition is satisfied in step S52, in step S53, an operator is notified to prompt an execution instruction for the forced regeneration process Rf of the DPF 32. This notification may be performed by a notification part 26 described below.

Then, in step S54, the execution instruction from the operator is monitored. If the execution instruction is received, in step S55, manual regeneration is executed as the forced regeneration process Rf of the DPF 32. The execution instruction from the operator may be received by an execution instruction receiving part 27 described later. Conversely, if the execution instruction is not received in step S54, the flowchart ends without executing the forced regeneration process Rf of the DPF 32. The case where the execution instruction is not received may include a case where the operator explicitly responds that the forced regeneration process Rf of the DPF 32 is not executed, and a case where the execution instruction is not received within a predetermined time. A specific method with which the operator sends the execution instruction may be an execution button (switch) or voice of the operator, described later.

On the other hand, if the manual regeneration condition is satisfied in step S52, in step S56, automatic regeneration of the DPF 32 is executed as the forced regeneration process Rf of the DPF 32.

Specifically, when the forced regeneration process of the DPF is stopped, the DPF is assumed to be in a state where PM is still excessively accumulated on the DPF.

In the above configuration, if the forced regeneration process Rf of the DPF 32 is stopped, the forced regeneration process Rf of the DPF 31 is automatically executed (automatic regeneration), or notification is issued to prompt execution of the forced regeneration process Rf of the DPF 32 (automatic regeneration) after completion of the DOC temperature increase control Rc, regardless of whether the forced regeneration execution condition is satisfied. Thus, the suspended forced regeneration process Rf of the DPF 32 is performed again, so that PM accumulated on the DPF 32 is reliably combusted. Further, since the forced regeneration process Rf of the DPF 32 is performed after completion of the DOC temperature increase control Rc, it is possible to reduce energy such as fuel used for the forced regeneration process Rf of the DPF 32.

Figure 6:
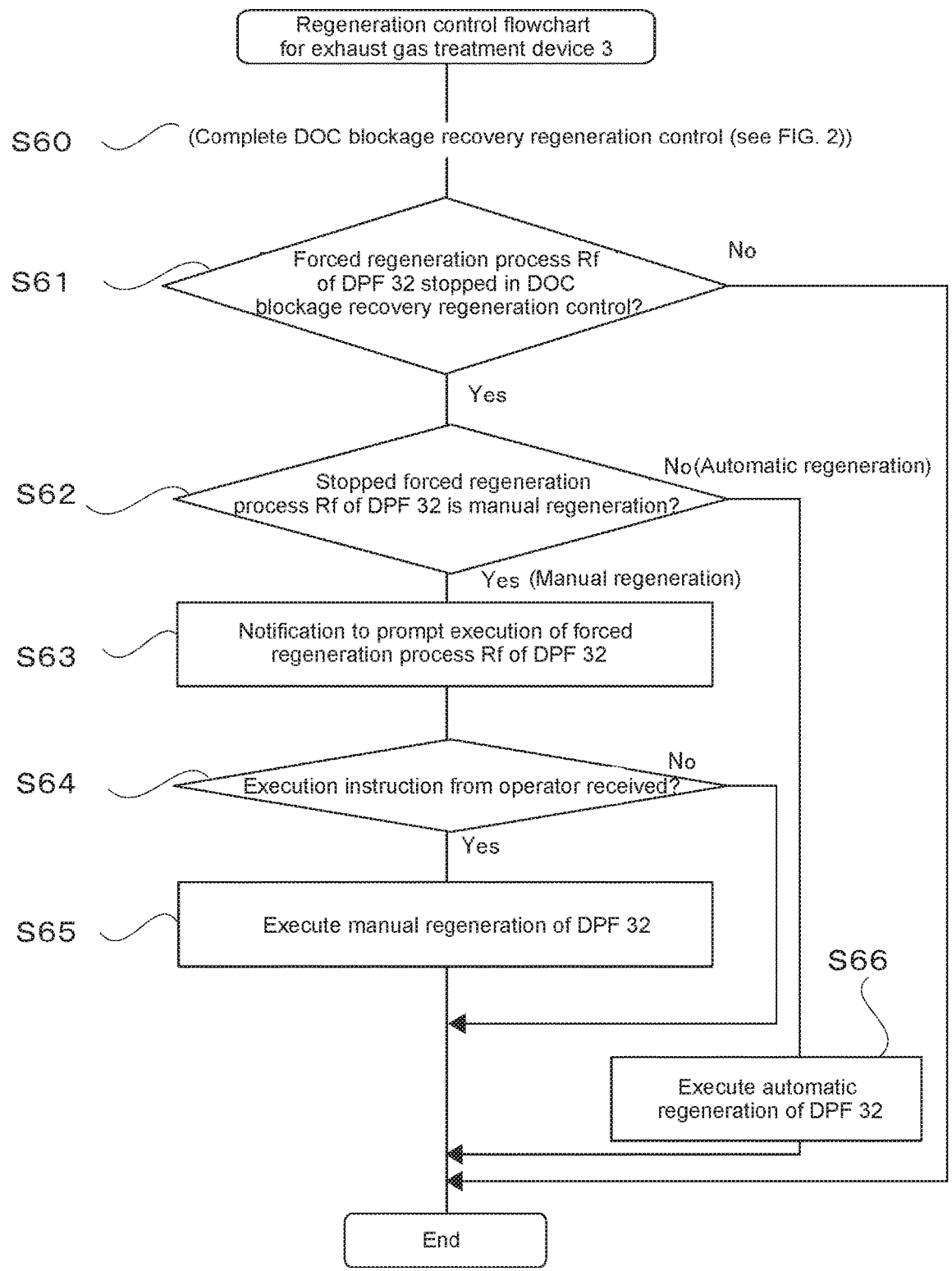
FIG. 6 is a flowchart of regeneration control for an exhaust gas treatment device including a DOC and a DPF according to an embodiment of the present invention, which shows a case where forced regeneration process of the DPF is stopped.

In some embodiments, after completion of the DOC temperature increase control Rc, the DPF forced regeneration execution part 24 executes the forced regeneration process Rf automatically or issues notification to prompt execution of the forced regeneration process Rf to continuously perform the forced regeneration process Rf. This intends to sufficiently regenerate the DPF 32 by restarting the stopped forced regeneration process Rf, for some embodiments where the forced regeneration process Rf of the DPF 32 is stopped when the blockage state D1 of the DOC 31 is detected during execution of the forced regeneration process Rf of the DPF 32. More specifically, as shown in FIG. 6, the regeneration control device 2 continuously executes the forced regeneration process Rf after completion of the DOC temperature increase control Rc. In the example shown in FIG. 6, the blockage state D1 of the DOC 31 is detected during execution of the forced regeneration process Rf of the DPF 32. Further, in step S60 of FIG. 6, the DOC temperature increase control Rc has been completed.

In step S61 of FIG. 6, after completion of the DOC temperature increase control Rc, it is confirmed whether the forced regeneration process Rf of the DPF 32 has been stopped in the DOC blockage recovery regeneration control. In step S61, if it is determined that the forced regeneration process Rf of the DPF 32 is not stopped in the DOC blockage recovery regeneration control, the flowchart ends as is. Conversely, in step S61, if it is determined that the forced regeneration process Rf of the DPF 32 is stopped in the DOC blockage recovery regeneration control, in step S62, the type of the forced regeneration process Rf of the DPF 32 that is stopped for execution of the DOC temperature increase control Rc is checked. Then, in step S62, if the type is determined to be manual regeneration condition, in step S63, an operator is notified to prompt an execution instruction for the forced regeneration process Rf (manual regeneration) of the DPF 32. This notification may be performed by a notification device described below.

Then, in step S64, the execution instruction from the operator is monitored. If the execution instruction is received, in step S65, manual regeneration of the DPF 32 is executed as the forced regeneration process Rf of the DPF 32. The execution instruction from the operator may be received by an execution instruction receiving part 27 described later. Conversely, if the execution instruction is not received in step S64, the flowchart ends without performing the forced regeneration process Rf of the DPF 32. The case where the execution instruction is not received may include a case where the operator explicitly responds that the forced regeneration process Rf of the DPF 32 is not executed, and a case where the execution instruction is not received within a predetermined time. A specific method with which the operator sends the execution instruction may be an execution button (switch) or voice of the operator, described below.

On the other hand, in step S62 of FIG. 6, if the type of the stopped forced regeneration process Rf of the DPF 32 is determined to be automatic regeneration, in step S66, automatic regeneration of the DPF 32 is executed as the forced regeneration process Rf of the DPF 32.

In some embodiments, in step S62 of FIG. 6, instead of checking the type of the stopped forced regeneration process Rf of the DPF 32, manual regeneration or automatic regeneration may be determined on the basis of the degree of blockage of the DPF 32. Specifically, if the degree of blockage of the DPF 32 is large, the type of the regeneration is determined to be manual regeneration, and the process progresses to step S63.

That is, when the forced regeneration process Rf of the DPF 32 is not stopped, for instance, even if the DOC temperature increase control Rc is executed as the DOC 31 is in the blockage risk state D2, the forced regeneration execution condition for the DPF 31 can be satisfied due to some factors.

In the above configuration, even if the forced regeneration process Rf of the DPF 32 is not stopped, the forced regeneration process Rf of the DPF 32 is automatically executed (automatic regeneration), or notification is issued to prompt execution of the forced regeneration process Rf of the DPF 32 (automatic regeneration) after completion of the DOC temperature increase control Rc if the forced regeneration execution condition is satisfied. Thus, PM accumulated on the DPF 32 is reliably combusted. Further, since the forced regeneration process Rf of the DPF 32 is performed after completion of the DOC temperature increase control Rc, it is possible to reduce energy such as fuel used for the forced regeneration process Rf of the DPF 32.

Figure 7:
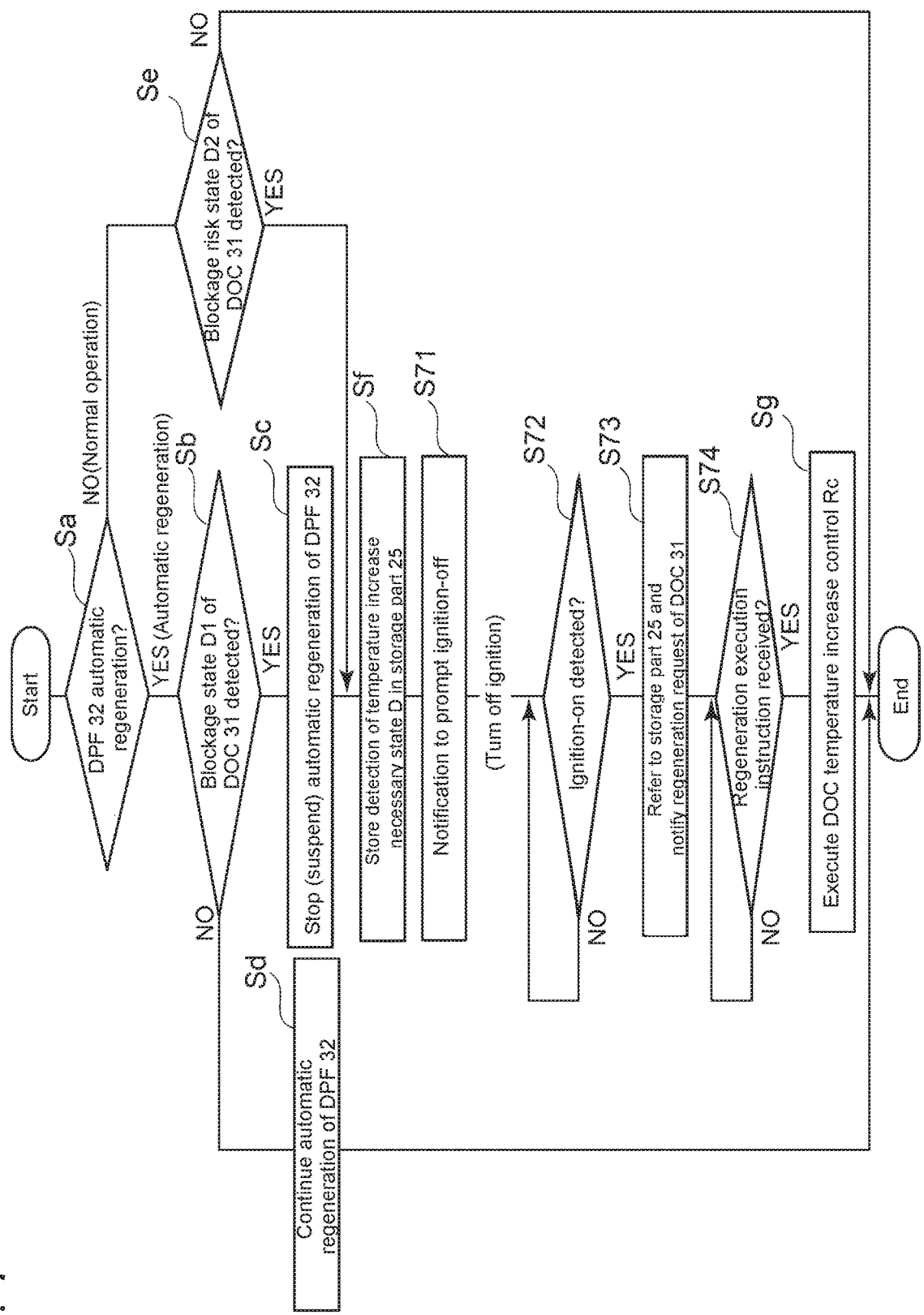
FIG. 7 is a diagram for describing a flowchart up to execution of DOC regeneration by a regeneration control device according to an embodiment of the present invention, where DOC temperature increase control is performed after receiving an execution command (regeneration execution instruction) from an operator.
Figure 8:
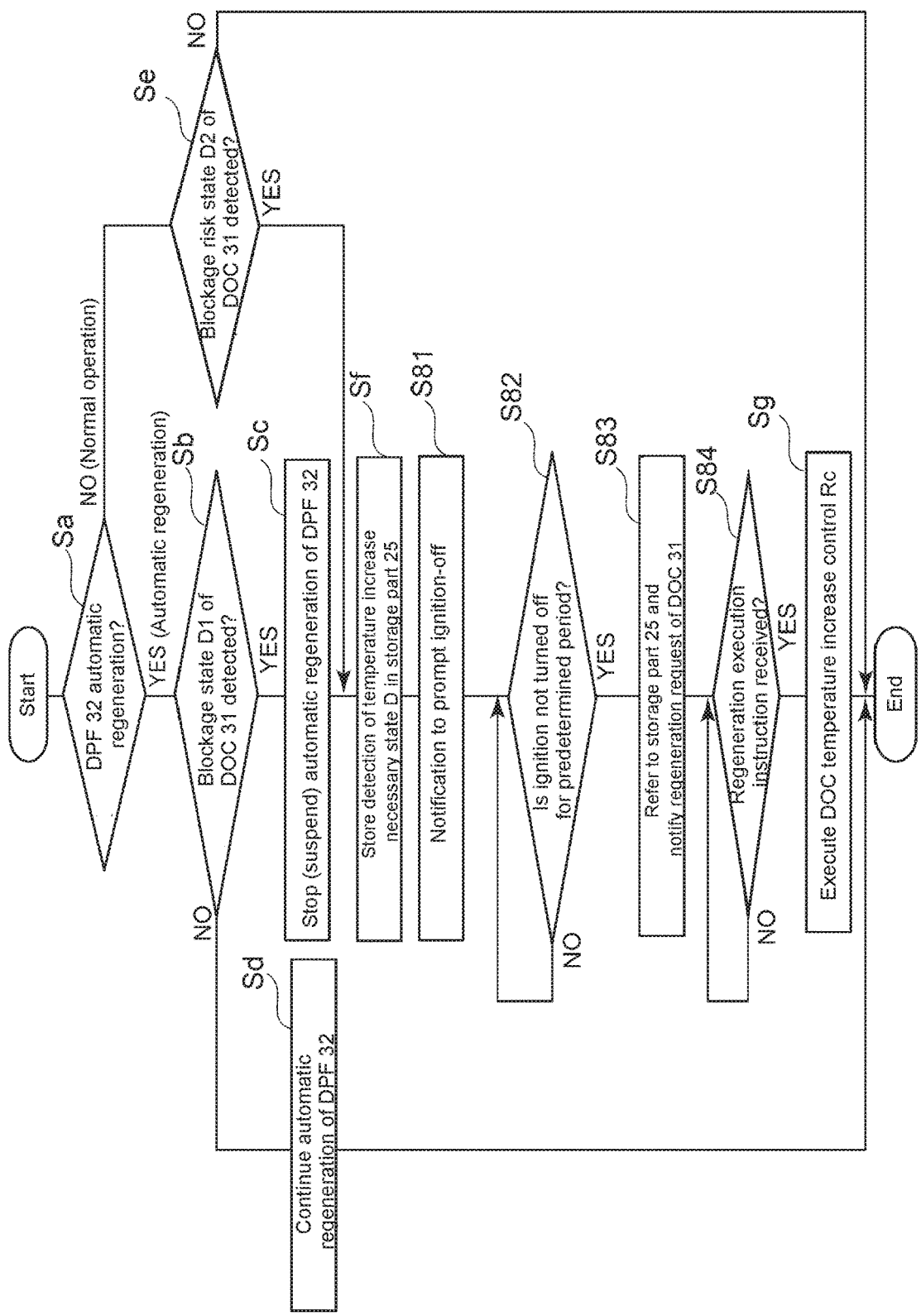
FIG. 8 is a diagram for describing a flowchart up to execution of DOC temperature increase control by a regeneration control device according to an embodiment of the present invention, where DOC temperature increase control is performed after receiving an execution command (regeneration execution instruction) from an operator.

Next, control of the regeneration control device 2 for the exhaust gas treatment device 3 including the DOC 31 and the DPF 32 will be described with reference to FIGS. 7 to 11. FIGS. 7 to 11 are each a diagram for describing a flowchart up to execution of the DOC temperature increase control Rc by the regeneration control device 2 according to an embodiment of the present invention. FIGS. 7 and 8 each show a flowchart where the DOC temperature increase control Rc is performed after receiving an execution command (regeneration execution instruction) from an operator, and FIGS. 9 to 11 each show a flowchart where the DOC temperature increase control Rc is performed without waiting for reception of an execution command (regeneration execution instruction) from an operator. The regeneration control device 2 may be set to switch between the embodiments as shown in FIGS. 7 to 11, or a specific embodiment may be implemented in the regeneration control device 2 alone. The regeneration control device 2 executes the flowchart as shown in FIGS. 7 to 11 along with a predetermined monitoring timing. The monitoring timing may be periodical, or may be a timing of determining whether the forced regeneration execution condition is satisfied, for instance. In the following, explanation is given in accordance with the flowcharts shown in FIGS. 7 to 11.

In some embodiments, as shown in FIGS. 7 to 11, the DOC temperature-increase-necessary-state detection part 21 is configured to detect the blockage parameter P during execution of the forced regeneration process Rf, and the DPF forced regeneration execution part 24 stops the forced regeneration process Rf if the DOC temperature-increase-necessary-state detection part 21 detects the blockage state D1 of the DOC 31.

Specifically, at a predetermined monitoring timing during operation of the engine 1, in step Sa of FIGS. 7 to 11, the regeneration control device 2 confirms whether the forced regeneration process Rf (automatic regeneration) of the DPF 32 is under execution. The forced regeneration process Rf in step Sa of FIGS. 7 to 11 is automatic regeneration of the DPF 32 because the engine 1 is under operation. If the DPF 32 is under automatic regeneration, in step Sb of FIGS. 7 to 11, it is confirmed whether the DOC 31 is in the blockage state D1. If the blockage state D1 of the DOC 31 is detected, in step Sc of FIGS. 7 to 11, the automatic regeneration of the DPF 32 is stopped (suspended). Then, the process progresses to step Sf of FIGS. 7 to 11 and continues (described below) to perform the DOC temperature increase control Rc (step Sg of FIGS. 7 to 11).

Conversely, in step Sb of FIGS. 7 to 11, if the blockage state D1 of the DOC 31 is not detected during the forced regeneration of the DPF 32, it progresses to step Sd of FIGS. 7 to 11, and the flowchart ends while the automatic regeneration continues.

Further, in the examples shown in FIGS. 7 to 11, if the DPF 32 is determined not under automatic regeneration but under normal operation in step Sa of FIGS. 7 to 11, it is confirmed whether the DOC 31 is in the blockage risk state D2 in step Se of FIGS. 7 to 11. If the blockage risk state D2 of the DOC 31 is not detected, the flowchart ends; conversely, if the blockage risk state D2 of the DOC 31 is detected, as described in the above case, the process progresses to step Sf of FIGS. 7 to 11, and processing continues (described below) to perform the DOC temperature increase control Rc (step Sg of FIGS. 7 to 11).

If the temperature increase necessary state D of the DOC 31 is detected in step Sb or step Se of FIGS. 7 to 11, the regeneration control device 2 may notify an operator of detection of the temperature increase necessary state D. This notification may continue after issue, or may be stopped at a predetermined timing before execution of the DOC temperature increase control Rc, for instance, immediately before the DOC temperature increase control Rc or when the ignition is off.

With the above configuration, it is possible to prevent slip of non-combusted fuel due to blockage of the DOC 31 upon execution of the forced regeneration process Rf, and it is possible to prevent deterioration of fuel efficiency, burn damage to the DPF 32, and oil dilution. Further, when the blockage state D1 of the DOC 31 is detected only during execution of the forced regeneration process Rf which causes the above problems, it is possible to reduce processing load of the regeneration control device 2 (processing load of the entire ECU 9) required for detecting the blockage state D1 of the DOC 31 during operation of the engine 1, and it is possible to efficiently detect the blockage state D1 of the DOC 31.

While in the embodiments shown in FIGS. 7 to 11, the monitoring timing is the same between the blockage state D1 and the blockage risk state D2 of the DOC 31, the present invention is not limited thereto. In some embodiments, the blockage state D1 and the blockage risk state D2 of the DOC 31 may have different monitoring timings. For instance, in some embodiments, the DOC temperature-increase-necessary-state detection part 21 may be configured to monitor the blockage state D1 of the DOC 31, regardless of execution of the forced regeneration process Rf of the DPF 32, so as to detect the blockage state D1 of the DOC 31 over the entire period when the engine 1 is operated.

Additionally, in some embodiments, as shown in FIG. 1, the regeneration control device 2 further includes a storage part 25 which stores detection information F indicating that the DOC temperature-increase-necessary-state detection part 21 detects the temperature increase necessary state D of the DOC 31. The storage part 25 may be an ROM, a non-volatile memory such as a flash memory, a volatile memory such as a RAM of the regeneration control device 2, or an exterior storage device connected to the regeneration control device 2. In the examples shown in FIGS. 7 to 11, in step Sf, the detection information F about the temperature increase necessary state D is stored in the storage part 25. At this time, in some embodiments, the content stored in the storage part 25 may be information simply indicating that the temperature increase necessary state D is detected (e.g., flag), or may be information in which the blockage state D1 and the blockage risk state D2 are distinguishable. In this case, if regeneration of the exhaust gas treatment device 3 including the DOC temperature increase control Rc is completed, the detection information F of the storage part 25 needs to be rewritten to indicate that the temperature increase necessary state D is no longer detected. Thereby, it is possible to reduce the amount of information stored in the storage part 25. Further, in some embodiments, the storage part 25 may store the detection information F in chronological order. For instance, the detection information F may be additionally stored every time the temperature increase necessary state D is detected, or other information (e.g., time-sequential information such as detection data and detection number, or values of sensors) related to the detection information F may be stored together with the detection information F, which can be used as an error history. In another embodiment, the detection information F may be a combination of the above-described examples (e.g., flag and error history).

With the above configuration, detection of the temperature increase necessary state D of the DOC 31 is stored as the detection information F. Thus, this detection information F can be used for maintenance or after-sales service, for instance. Further, as described below, even in a case where the DOC temperature increase control Rc is executed when ignition is turned on again after once turned off, the regeneration control device 2 that is rebooted can recognize, through the detection information F, that the temperature increase necessary state D of the DOC 31 is detected before rebooting.

Next, the flowchart between step Sf of FIGS. 7 to 11 (described below) and execution of the DOC temperature increase control Rc (step Sg of FIGS. 7 to 11) will be described. To execute this flowchart, as shown in FIG. 1, the regeneration control device 2 includes a notification part 26 and an execution instruction receiving part 27 (corresponding to the embodiments shown in FIGS. 7 and 8). Further, the regeneration control device 2 shown in FIG. 1 may include an informing part 28 (corresponding to the embodiments shown in FIGS. 9 to 11). Alternatively, the regeneration control device 2 may include the notification part 26, the execution instruction receiving part 27, and the informing part 28.

The notification part 26 outputs a regeneration request to notify an operator that the DOC temperature-increase-necessary-state detection part 21 detects the temperature increase necessary state D of the DOC 31. The notification part 26 may notify the operator of the regeneration request via a notification device. The notification device may be a screen, a speaker, a lighting device such as LEDs and lamps. The notification part 26 may be connected to the notification device. Further, an operator may be notified by visual notification such as display on the screen, lighting or flashing of the lighting device, auditory notification by sound or voice, vibration, or combination of the above.

The execution instruction receiving part 27 receives, from the operator, a response to the regeneration request output from the notification part 26 as a regeneration execution instruction. More specifically, the execution instruction receiving part 27 is connected to an execution button (switch) to be operated by the operator. When the operator turns on the execution button, the execution instruction receiving part 27 receives the regeneration execution instruction. The execution button may be a physical button or a switch, and may be switched on by pushing the button or throwing the switch. Alternatively, the execution button may be displayed on the screen, and may be switched on by touching a button on the screen. The execution instruction receiving part 27 may be connected to a microphone, and the execution instruction receiving part 27 may receive the regeneration execution instruction in response to the voice of the operator.

The informing part 28 informs the DOC temperature increase execution part 22 that the DOC temperature-increase-necessary-state detection part 21 detects the temperature increase necessary state D of the DOC 31.

Figure 9:
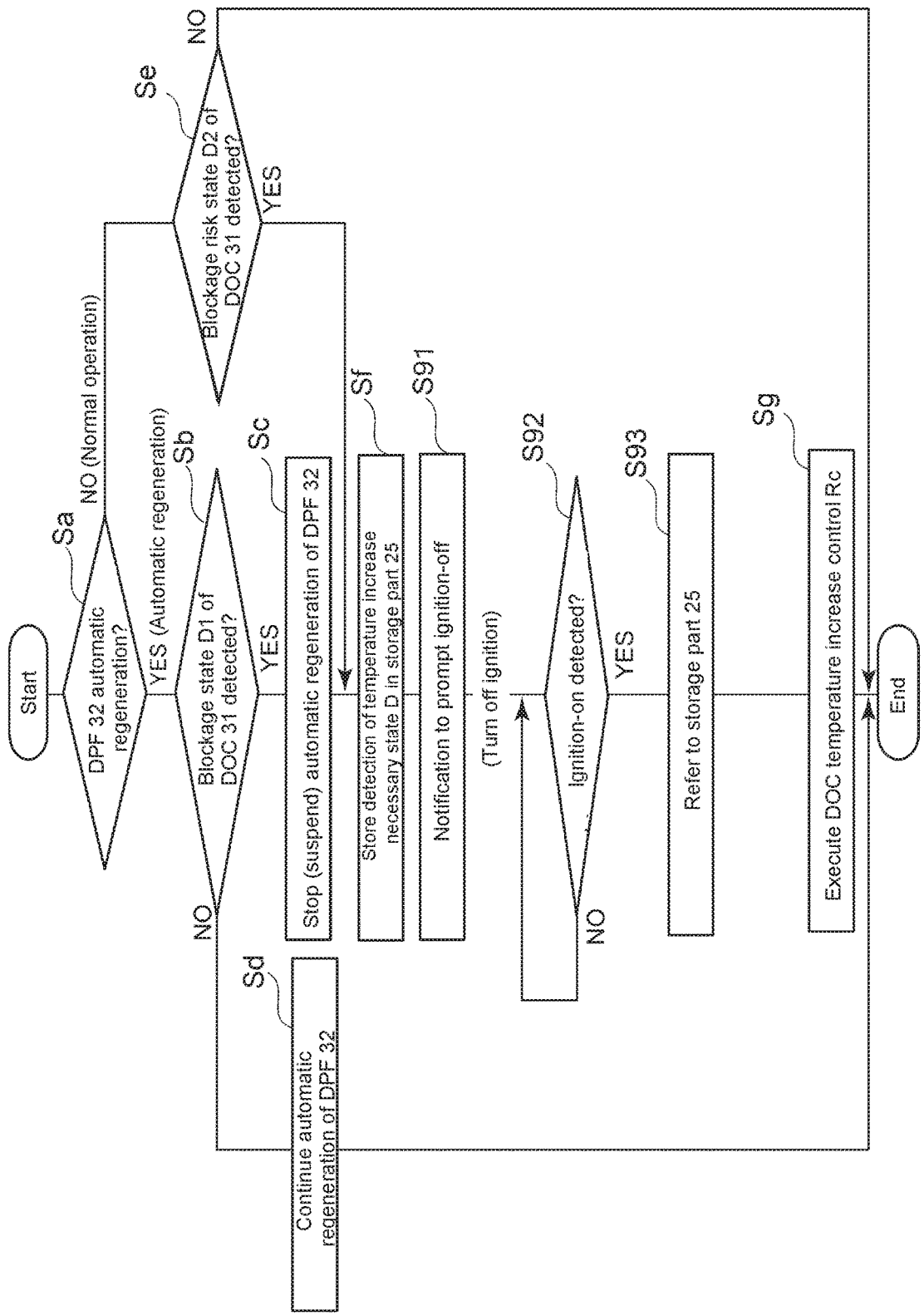
FIG. 9 is a diagram for describing a flowchart up to execution of DOC temperature increase control by a regeneration control device according to an embodiment of the present invention, where DOC temperature increase control is performed without waiting for reception of an execution command (regeneration execution instruction) from an operator.
Figure 10:
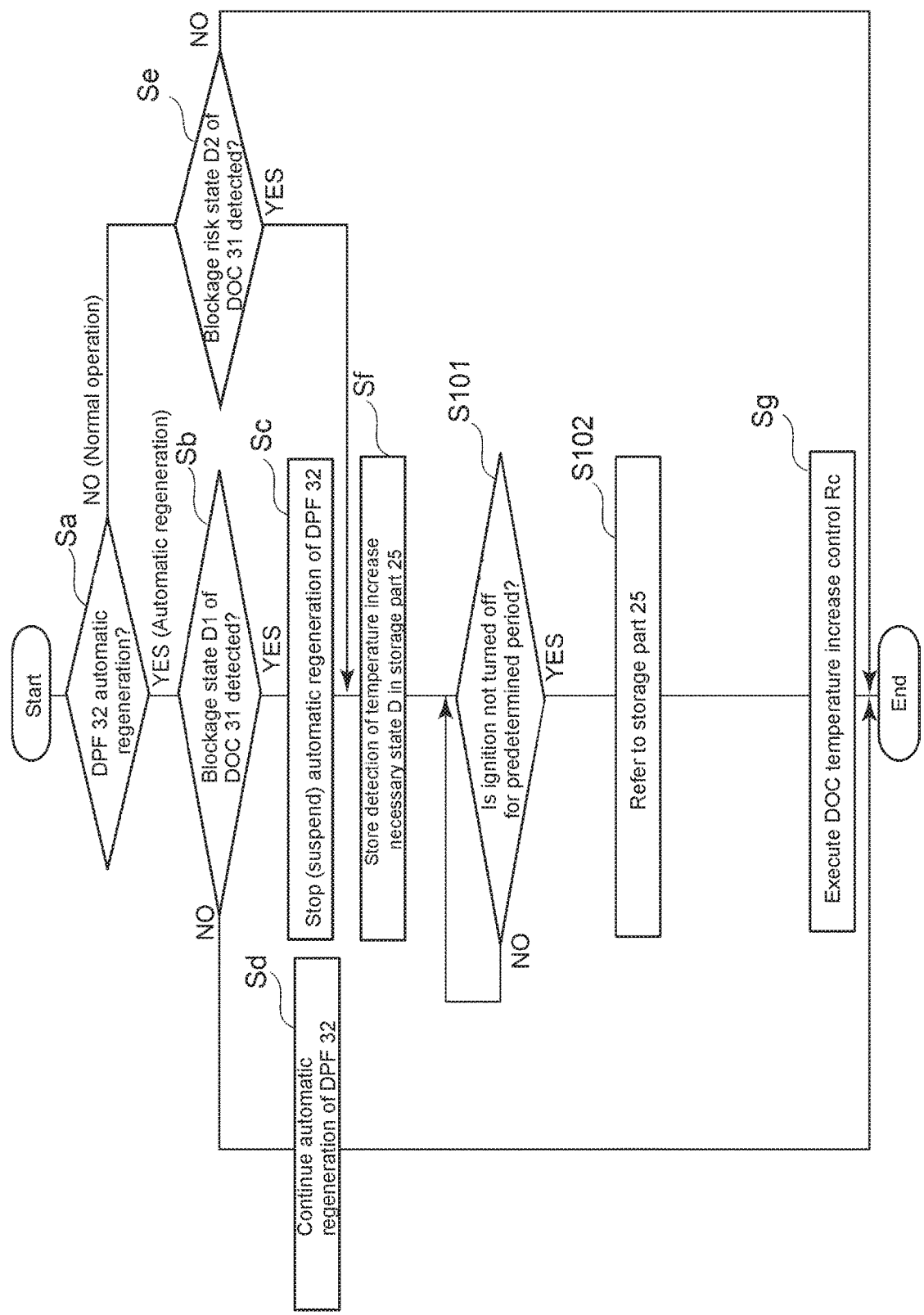
FIG. 10 is a diagram for describing a flowchart up to execution of DOC temperature increase control by a regeneration control device according to an embodiment of the present invention, where DOC temperature increase control is performed without waiting for reception of an execution command (regeneration execution instruction) from an operator.
Figure 11:
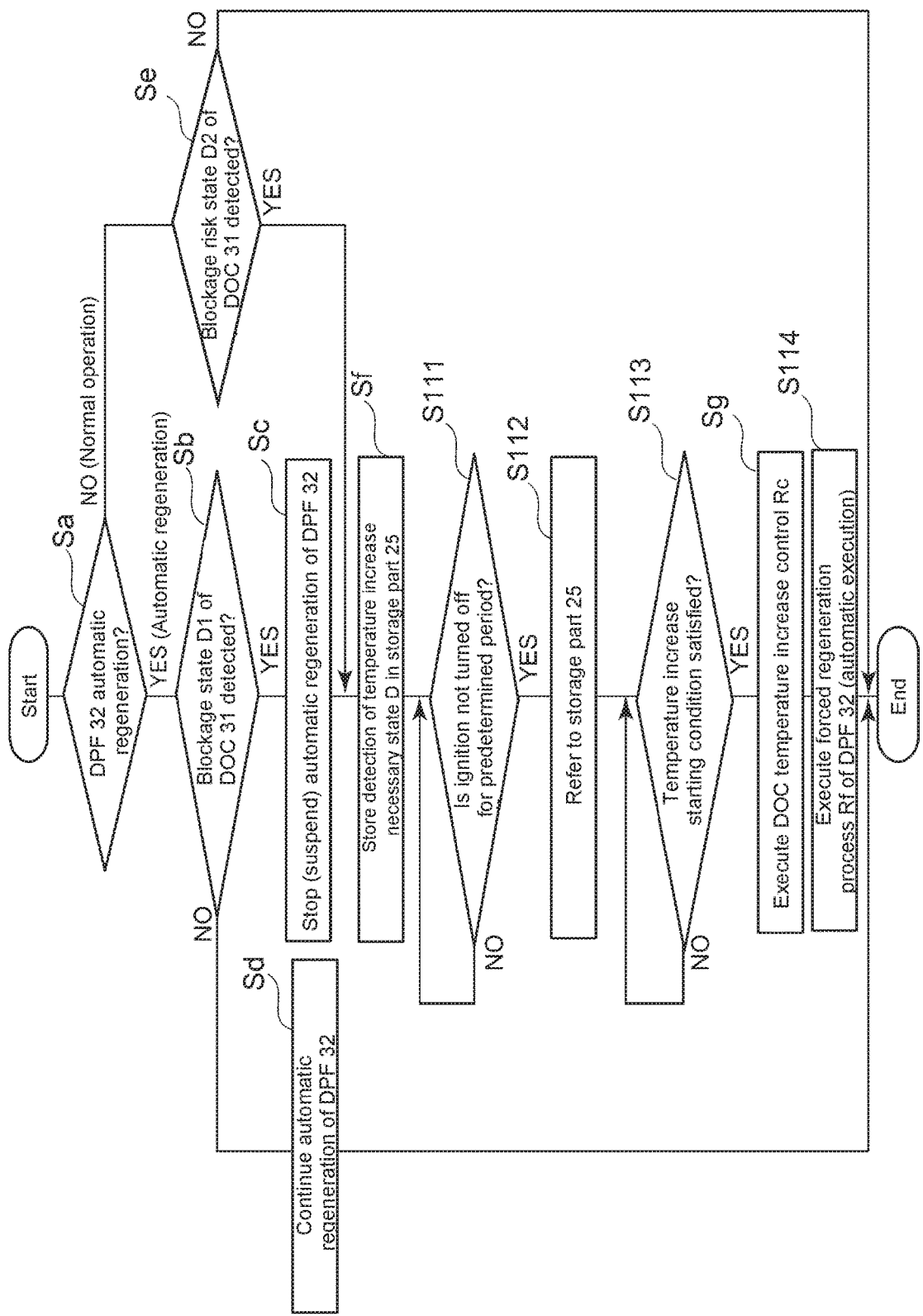
FIG. 11 is a diagram for describing a flowchart up to execution of DOC temperature increase control by a regeneration control device according to an embodiment of the present invention, where DOC temperature increase control is performed without waiting for reception of an execution command (regeneration execution instruction) from an operator if a forced regeneration execution condition for the DPF is satisfied.

In some embodiments, as shown in FIGS. 7 to 9, the notification part 26 may issue notification to prompt turning-off of an ignition key when the DOC temperature-increase-necessary-state detection part 21 detects the temperature increase necessary state D of the DOC 31. In the example shown in FIGS. 7 to 9, in a step (step S71 of FIG. 7, step S81 of FIG. 8, step S91 of FIG. 9) subsequent to step Sf of FIGS. 7 to 9, notification is issued to prompt ignition-off. Thereby, it is possible to prompt an operation (turning-off of the ignition key) required for execution of the DOC temperature increase control Rc in a case where the DOC temperature increase control Rc is performed after receiving the regeneration execution instruction from the operator. The invention is not limited thereto, and the notification to prompt ignition-off is optional. In other embodiments, the notification to prompt ignition-off may be not issued. For instance, as seen in FIGS. 10 and 11 described below, when the DOC temperature increase control Rc is executed regardless of ignition-on, this notification is unnecessary. Further, this notification is also unnecessary when applied to a construction machine or a vehicle which cannot stop the engine 1 immediately after detection of the temperature increase necessary state D.

With the above configuration, it is possible to prompt an operation (turning-off of the ignition key) required for execution of the DOC temperature increase control Rc in a case where the DOC temperature increase control Rc is performed after receiving the regeneration execution instruction from the operator.

Further, in some embodiments, as shown in FIG. 7, the notification part 26 outputs a regeneration request when the ignition key is turned on, and the DOC temperature increase execution part 22 executes the DOC temperature increase control Rc when the execution instruction receiving part 27 receives the regeneration execution instruction. The reason is that it is undesirable to execute the DOC temperature increase control Rc immediately when the temperature increase necessary state of the DOC is detected, for some types of application such as a construction machine or a vehicle equipped with the regeneration control device.

In the example shown in FIG. 7, after the above-described step S71 (notification to prompt ignition-off), the ignition is turned off. Then, in step S72, ignition-on is monitored. Further, in step S72 of FIG. 7, if ignition-on is detected, in step S73, detection of the temperature increase necessary state D of the DOC 31 is recognized by referring to the detection information F stored in the storage part 25, and the regeneration request for regenerating the DOC 31 is notified. Thereafter, in step S74, reception of the regeneration execution instruction from the operator is awaited, and in step Sg, once the regeneration execution instruction is received, the DOC temperature increase control Rc starts.

With the above configuration, the DOC temperature increase control Rc is executed from a state where the engine 1 is stopped. Specifically, when the engine 1 is stopped, the application such as a construction machine and a vehicle equipped with the regeneration control device 2 is assumed to be in safe state. Thus, with the notification part 26, it is possible to execute the DOC temperature increase control Rc after the application is put in the safe state. Further, the DOC temperature increase control Rc starts after receiving the regeneration execution instruction from the operator. That is, although it is undesirable for some types of the application to execute the DOC temperature increase control Rc immediately when the temperature increase necessary state of the DOC 31 is detected, it is possible to execute the DOC temperature increase control Rc in accordance with the type of the application.

In some embodiments, as shown in FIG. 8, if the ignition key is not tuned off for a predetermined time after the DOC temperature-increase-necessary-state detection part 21 detects the temperature increase necessary state D of the DOC 31, the notification part 26 outputs a regeneration request without waiting for turning-off of the ignition key, and the DOC temperature increase control Rc is executed if the execution instruction receiving part 27 receives the regeneration execution instruction. The turning-off of the ignition key may be detected through switching off of the ignition (ignition device).

In the example shown in FIG. 8, after the above-described step S81 (notification to prompt ignition-off), in step S82, it is monitored whether the ignition is not turned off for a predetermined time. Further, in step S82 of FIG. 8, if the above-described condition is satisfied, in step S83, detection of the temperature increase necessary state D of the DOC 31 is recognized by referring to the detection information F stored in the storage part 25, and the regeneration request for regenerating the DOC 31 is notified. Thereafter, in step S84, reception of the regeneration execution instruction from the operator is awaited, and in step Sg, once the regeneration execution instruction is received, the DOC temperature increase control Rc starts. The predetermined time in step S82 may be zero.

With the above configuration, even in a case where the operator is unawares of detection of the temperature increase necessary state D of the DOC 31, or in a case where the engine 1 is continuously operated due to unawareness during operation of the engine 1, it is possible to reliably execute the DOC temperature increase control Rc after elapse of a predetermined time.

In some embodiments, as shown in FIG. 9, when the ignition key is turned on, the informing part 28 informs the DOC temperature increase execution part 22 that the temperature increase necessary state D of the DOC 31 is detected, and once the DOC temperature increase execution part 22 is informed of detection of the temperature increase necessary state D of the DOC 31 by the informing part 28, the DOC temperature increase execution part 22 automatically executes the DOC temperature increase control Rc.

In the example shown in FIG. 9, after the above-described step S91 (notification to prompt ignition-off), the ignition is turned off. Then, in step S92, ignition-on is monitored. Further, in step S92 of FIG. 9, if ignition-on is detected, in step S93, detection of the temperature increase necessary state D of the DOC 31 is recognized by referring to the detection information F stored in the storage part 25. Thus, in step Sg, the DOC temperature increase control Rc starts.

With the above configuration, the DOC temperature increase control Rc is executed from a state where the engine 1 is stopped. Specifically, when the engine 1 is stopped, the application such as a construction machine and a vehicle equipped with the regeneration control device 2 is assumed to be in safe state. Thus, with the notification part 26, it is possible to execute the DOC temperature increase control Rc after the application is put in the safe state. Moreover, since the DOC temperature increase control Rc is executed in conjunction with ignition-on, it is possible to reduce load on the operator, and it is possible to reliably execute the DOC temperature increase control Rc.

In some embodiments, as shown in FIG. 10, if the ignition key is not tuned off for a predetermined time after the DOC temperature-increase-necessary-state detection part 21 detects the temperature increase necessary state D of the DOC 31, the informing part 28 informs the DOC temperature increase execution part 22, without waiting for turning-off of the ignition key, that the temperature increase necessary state D of the DOC 31 is detected, and once the DOC temperature increase execution part 22 is informed of detection of the temperature increase necessary state D of the DOC 31 by the informing part 28, the DOC temperature increase execution part 22 automatically executes the DOC temperature increase control Rc.

In the example shown in FIG. 10, after the above-described step Sf (storing detection of the temperature increase necessary state D in the storage part 25), in step S101, it is monitored whether the ignition is not turned off for a predetermined time. Further, in step S101, if the above-described condition is satisfied, in step S102, detection of the temperature increase necessary state D of the DOC 31 is recognized by referring to the detection information F stored in the storage part 25. Thus, in the subsequent step Sg, the DOC temperature increase control Rc starts. The predetermined time in step S101 may be zero.

With the above configuration, when the temperature increase necessary state D of the DOC 31 is detected, the DOC temperature increase control Rc is automatically executed after elapse of the predetermined time, without operation by the operator or the like. Thus, it is possible to reliably execute the DOC temperature increase control Rc without waiting for operation of the ignition key by the operator.

In some embodiments, as shown in FIG. 11, if the ignition key is not tuned off for a predetermined time after the DOC temperature-increase-necessary-state detection part 21 detects the temperature increase necessary state D of the DOC 31 and further if a temperature increase starting condition (described later) is satisfied, the informing part 28 informs, without waiting for turning-off of the ignition key, the DOC temperature increase execution part 22 that the temperature increase necessary state D of the DOC 31 is detected, and once the DOC temperature increase execution part 22 is informed of detection of the temperature increase necessary state D of the DOC 31 by the informing part 28, the DOC temperature increase execution part 22 automatically executes the DOC temperature increase control Rc.

In the example shown in FIG. 11, after the above-described step Sf (storing detection of the temperature increase necessary state D in the storage part 25), in step S111, it is monitored whether the ignition is not turned off for a predetermined time. Further, in step S111, if the above-described condition is satisfied, in step S112, detection of the temperature increase necessary state D of the DOC 31 is recognized by referring to the detection information F stored in the storage part 25. Then, in step S113, it is determined whether the temperature increase starting condition (described below) is satisfied. In the example shown in FIG. 11, the monitoring in step S113 is repeated until the temperature increase starting condition (described below) is satisfied.

In step S113, if the temperature increase starting condition (described below) is satisfied, in the subsequent step Sg, the DOC temperature increase control Rc starts. Further, in the example shown in FIG. 11, after completion of the DOC temperature increase control Rc, in step S114, the forced regeneration process Rf of the DPF 32 is performed. Further, in the example shown in FIG. 11, the forced regeneration process Rf of the DPF 32 is automatically performed after completion of the DOC temperature increase control Rc, by increasing the temperature of the exhaust gas treatment device 3 as shown in FIG. 3. The predetermined time in step S111 may be zero.

With the above configuration, when the temperature increase necessary state D of the DOC 31 is detected, the DOC temperature increase control Rc is automatically executed after elapse of the predetermined time, without operation by the operator or the like, if the temperature increase starting condition (described below) is satisfied after elapse of the predetermined time. Thus, it is possible to reliably execute the DOC temperature increase control Rc without waiting for operation of the ignition key by the operator.

The temperature increase starting condition will be described in detail. In some embodiments, the temperature increase starting condition includes a condition under which the DOC 31 is presumed to be activated (DOC activation condition). More specifically, the DOC activation condition includes at least one of the following conditions: if the inlet temperature of the DOC 31 or the outlet temperature of the DOC 31 exceeds a predetermined value (threshold), or if the operation state of the engine 1 is within a predetermined operation range which can increase to the first temperature T1. That is, the regeneration control device 2 determines whether the DOC 31 is to be activated, based on the temperature increase starting condition including the DOC activation condition, and if the DOC 31 is presumed to be activated, the DOC temperature increase control Rc starts. Thus, the regeneration control device 2 monitors at least one of the inlet temperature of the DOC 31, the outlet temperature of the DOC 31, or the operation state of the engine 1. Further, it is determined that the temperature increase starting condition is satisfied if at least one of the following conditions is met: if the inlet temperature of the DOC 31 exceeds a predetermined value (threshold); the outlet temperature of the DOC 31 exceeds a predetermined value (threshold); or the operating state (load) of the engine 1 is within a predetermined operation range which can increase to the first temperature T1 (for instance, within an area except for extremely low load).

With the above configuration, it is determined whether the DOC 32 is to be activated based on the DOC activation condition, and the DOC temperature increase control Rc is executed when the temperature increase starting condition is satisfied. Thereby, it is possible to efficiently execute the DOC temperature increase control Rc.

In some embodiments, the temperature increase starting condition further include a forced regeneration execution condition for the DPF 32, and the informing part 28 determines that the temperature increase starting condition is satisfied if the DOC activation condition and the forced regeneration execution condition for the DPF 32 are satisfied. The forced regeneration execution condition for the DPF 32 is confirmed at a predetermined timing periodically, for instance. Specifically, the DOC temperature increase control Rc starts when the forced regeneration execution condition for the DPF 32 is satisfied, so that the DOC temperature increase control Rc is executed in accordance with the timing of execution of the forced regeneration process Rf of the DPF 32. For instance, even if the blockage state D1 of the DOC 31 is detected during automatic regeneration of the DPF 32, the forced regeneration execution condition cannot be satisfied at determination in step S113 of FIG. 11 in some cases. In such cases, the DOC temperature increase control Rc starts if the forced regeneration execution condition is satisfied at the next timing of confirmation of the forced regeneration execution condition for the DPF 32. In step S113 of FIG. 11, it may be monitored whether the automatic regeneration execution condition for the DPF 32 is satisfied. Alternatively, in some embodiments, it may be monitored whether the manual regeneration execution condition for the DPF 32 is satisfied. In other embodiments, it may be monitored whether at least one of the automatic regeneration execution condition or the manual regeneration execution condition is satisfied.

With the above configuration, the DOC temperature increase control Rc automatically starts in accordance with the timing of determination that the forced regeneration process Rf of the DPF 32 is necessary. Thus, it is possible to prevent slip of non-combusted fuel or the like upon execution of the forced regeneration process Rf of the DPF 32 after completion of the DOC temperature increase control Rc. Additionally, since the forced regeneration process Rf of the DPF 32 is performed starting from a state where the temperature of the DPF 32 is increased by the DOC temperature increase control Rc, it is possible to efficiently regenerate the exhaust gas treatment device 3, compared with a case where the forced regeneration of the DPF 32 is performed independently from the removal of substances adhering to the upstream end surface of the DOC 31.

Hereinafter, a method for detecting the blockage state of the DOC 31 will be described.

In some embodiments, the blockage parameter is set on the basis of the inlet temperature of the DPF 32 and the outlet temperature of the DPF 32.

Specifically, if blockage of the DOC 31 progresses, fuel is not sufficiently oxidized by the DOC 31, and the DPF inlet temperature does not sufficiently increase. Further, non-combusted fuel having slipped the DOC 31 is combusted by the DPF 32 on the downstream side, and thus the DPF outlet temperature increases excessively. Thus, if blockage of the DOC 31 progresses, the temperature difference ($\Delta Tp$) between the DPF outlet temperature and the DPF inlet temperature increases.

Thus, the blockage parameter Pr1 can be set as in the following equation (1) as a temperature difference between Tp1 and Tp2, where Tp1 is the inlet temperature of the DPF 32 and Tp2 is the outlet temperature of the DPF 32. In this case, the blockage parameter Pr1 increases with the progress of blockage of the DOC 31.

$$Pr1=(TP2-TP1) \quad (1)$$

According to the above embodiment, blockage of the DOC 31 and the blockage initial stage of the DOC 31 can be detected by detecting the inlet temperature of the DPF 32 and the outlet temperature of the DPF 32.

In some embodiments, the blockage parameter P is set as the outlet temperature of the DPF 32.

Specifically, if blockage of the DOC 31 progresses as described above, non-combusted fuel having slipped the DOC 31 is combusted by the DPF 32 on the downstream side, and thus the DPF outlet temperature increases excessively. Thus, the blockage parameter Pr2 can be set as in the following equation (2), where Tp2 is the outlet temperature of the DPF. In this case, the blockage parameter Pr2 increases with the progress of blockage of the DOC 31.

$$Pr2=Tp2 \quad (2)$$

According to the above embodiment, blockage of the DOC 31 and the blockage initial stage of the DOC 31 can be detected by detecting the outlet temperature of the DPF 32.

In some embodiments, the blockage parameter P is set on the basis of the temperature difference between the outlet temperature and the inlet temperature of the DOC 31, the flow rate of exhaust gas flowing through the DOC 31, and the fuel injection amount of late-post injection (or exhaust-pipe injection).

Specifically, if blockage of the DOC 31 progresses, the fuel injected by late-post injection (or exhaust-pipe injection) is not oxidized sufficiently by the DOC 31, and the calorific value of the DOC 31 with respect to the fuel injection amount decreases. Thus, the blockage parameter Pr3 can be set as in the following equation (3), where $\Delta To$ is a temperature difference between the outlet temperature and the inlet temperature of the DOC 31, Qe is the flow rate of exhaust gas flowing through the DOC 31, and Qfe is the fuel injection amount of late-post injection (or exhaust-pipe injection). In this case, the blockage parameter Pr3 increases with the progress of blockage of the DOC 31.

$$Pr3=Qfe/\Delta To \cdot Qe \quad (3)$$

According to the above embodiment, blockage of the DOC 31 and the blockage initial stage of the DOC 31 can be detected by detecting the inlet temperature and the outlet temperature of the DOC 31, and the fuel injection amount of late-post injection (or exhaust-pipe injection).

In some embodiments, the above blockage parameter is set on the basis of an increase speed of the inlet temperature of the DPF 32 and an increase speed of the inlet temperature of the DPF 32 in an initial state in which the DOC 31 is not blocked.

Specifically, if blockage of the DOC 31 progresses, fuel is not sufficiently oxidized by the DOC 31, and the increase speed of the DPF inlet temperature slows down. Thus, the blockage parameter Pr4 can be set as in the following equation (4), where Vt is an increase speed of the inlet temperature of the DPF 32 and Vt' is an increase speed of the inlet temperature of the DPF 32 in an initial state in which the DOC 31 is not blocked. In this case, the blockage parameter Pr4 increases with the progress of blockage of the DOC 31.

$$Pr4=Vt'/Vt \quad (4)$$

According to the above embodiment, blockage of the DOC 31 and the blockage initial stage of the DOC 31 can be detected by measuring in advance the increase speed of the DPF inlet temperature in the initial state and detecting the increase speed of the DPF inlet temperature.

The increase speed Vt of the DPF inlet temperature and the increase speed Vt' of the inlet temperature of the DPF in the initial state in the above embodiment are detected under the same conditions which affect the increase speed, such as the fuel injection amount and the injection timing.

In some embodiments, the above-described late-post injection control unit (or exhaust-pipe injection control unit) 14 is configured to control the fuel injection amount so that the inlet temperature of the DPF 32 reaches a target temperature required to execute forced regeneration. The above-described blockage parameter P is set on the basis of: the cumulative fuel-injection amount of late-post injection (or exhaust-pipe injection) of injection during an increase of the inlet temperature of the DPF 32 by a predetermined temperature, and the cumulative fuel-injection amount of late-post injection (or exhaust-pipe injection) of injection during an increase in the DPF inlet temperature by a predetermined temperature in an initial state in which the DOC 31 is not blocked; or the mean injection amount of late-post injection (or exhaust-pipe injection) of injection in a stable state in which the inlet temperature of the DPF 32 has reached a target control temperature, and the mean injection amount of late-post injection (or exhaust-pipe injection) of injection in a stable state in which the inlet temperature of the DPF 32 has reached a target control temperature in an initial state in which the DOC 31 is not blocked.

Specifically, the late-post injection control unit (or exhaust-pipe injection control unit) 14 is configured to control the fuel injection amount so that the inlet temperature of the DPF 32 reaches the target temperature required to execute forced regeneration. Thus, if blockage of the DOC 31 progresses and the fuel is not sufficiently oxidized by the DOC 31 with an insufficient increase of the DPF inlet temperature, the late-post injection control unit (or exhaust-pipe injection control unit) 14 performs a control to increase the late-post injection amount (or exhaust-pipe injection amount). Accordingly, the blockage parameter Pr5 can be set by, for instance, the following equation (5), where $\Sigma Qfl$ is the cumulative fuel-injection amount of late-post injection (or exhaust-pipe injection) of injecting while the inlet temperature of the DPF 32 increases by a predetermined temperature, and $\Sigma Qfl'$ is the cumulative fuel-injection amount of late-post injection (or exhaust-pipe injection) of injecting while the DPF inlet temperature increases by a predetermined temperature in an initial state in which the DOC 31 is not blocked. In this case, the blockage parameter Pr5 increases with progress of blockage of the DOC 31.

$$Pr5=\Sigma Qfl/\Sigma Qfl' \quad (5)$$

Alternatively, the blockage parameter Pr5' can be set by, for instance, the following equation (5)', where QgI is the mean fuel-injection amount of late-post injection (or exhaust-pipe injection) of injection in a stable state in which the inlet temperature of the DPF 32 has reached a target control temperature, and QgI' is the mean fuel-injection amount of late-post injection (or exhaust-pipe injection) of injection in a state in which the inlet temperature of the DPF 32 has reached a target control temperature in an initial state in which the DOC 31 is not blocked. In this case, the blockage parameter Pr5' increases with progress of blockage of the DOC 31.

$$Pr5'=QgI/QgI' \qquad (5)'$$

According to the above embodiment, blockage of the DOC 31 and the blockage initial stage of the DOC 31 can be detected by measuring in advance the cumulative fuel-injection amount of late-post injection (or exhaust-pipe injection) of injecting while the DPF inlet temperature increases by a predetermined temperature in the initial state, and detecting the cumulative amount of late-post injection (or exhaust-pipe injection) of injecting while the DPF inlet temperature increases by a predetermined temperature.

Further, in the above embodiment, the above-described ΣQfl, ΣQfl', QgI, and QgI' are detected under the same conditions which affect the cumulative amount of late-post injection or exhaust-pipe injection, such as the fuel-injection timing and the increase speed of the DPF inlet temperature.

Further, in some embodiments, the above-described blockage threshold and the second blockage threshold are set to be larger with greater thermal deterioration of the DOC 31.

If thermal deterioration progresses in the DOC 31, the oxidization performance deteriorates, thus affecting the value of the blockage parameter P to increase. Thus, according to the above embodiment, blockage of the DOC 31 and the blockage initial stage of the DOC 31 can be detected accurately regardless of thermal deterioration of the DOC 31 by setting the blockage threshold taking account of the influence of the thermal deterioration of the DOC 31.

Further, in some embodiments, when the blockage parameter P is a DPF inlet and outlet temperature difference ΔTp and the blockage threshold is a predetermined temperature, the blockage state of the DPC 31 may be determined on the basis of comparison between the DPF inlet and outlet temperature difference ΔTp and the blockage threshold. For instance, in a case where the blockage threshold is set to be 70° C., the blockage may be detected when ΔTp>70° C.

Embodiments of the present invention were described in detail above, but the present invention is not limited thereto, and various amendments and modifications may be implemented.

REFERENCE SIGNS LIST

1 Diesel engine (Engine)
11 Engine body
12 Combustion chamber
13 Intake passage
14 Intake port
15 Intake manifold
16 Exhaust passage
17 Exhaust port
2 Regeneration control device
21 DOC temperature-increase-necessary-state detection part
22 DOC temperature increase execution part
23 DPF forced-regeneration-condition determination part
24 DPF forced regeneration execution part
25 Storage part
26 Notification part
27 Execution instruction receiving part
28 Informing part
3 Exhaust gas treatment device
31 DOC
32 DPF
4 Temperature increase unit
41 Fuel injection device
42 Throttle valve
44 Exhaust pipe injection device
5 Temperature sensor
51 DOC inlet temperature sensor
52 DPF inlet temperature sensor
53 DPF outlet temperature sensor
6 Pressure sensor
61 DPF inlet pressure sensor
62 DPF outlet pressure sensor
63 DPF differential-pressure sensor
7 Exhaust turbocharger
71 Exhaust turbine
72 Compressor
73 Shaft
8 EGR device
81 EGR pipe
82 EGR valve
9 ECU
P Blockage parameter
D Temperature increase necessary state of DOC
D1 Blockage state of DOC
D2 Blockage risk state of DOC
Rc DOC temperature increase control
Rc1 First temperature increase process
Rc2 Second temperature increase process
Rf Forced regeneration process of DPF
T1 First temperature
T2 Second temperature
T3 Third temperature
F Detection information

The invention claimed is:

1. A regeneration control device controlling a temperature increase unit of an exhaust gas treatment device including a diesel oxidation catalyst (DOC) disposed in an exhaust passage of a diesel engine to regenerate the exhaust gas treatment device, the regeneration control device comprising:

a DOC temperature-increase-necessary-state detection part configured to detect a temperature increase necessary state including at least one of a blockage state of the DOC or a blockage risk state of the DOC, the blockage state being detected on the basis of comparison between a blockage parameter related to blockage of the DOC and a predetermined blockage threshold, the blockage risk state being detected when the diesel engine is in an operating state that is likely to cause blockage of the DOC; and a DOC temperature increase execution part configured to execute a DOC temperature increase control including:
a first temperature increase process to control the temperature increase unit, if the temperature increase necessary state of the DOC is detected, so as to increase a temperature of the DOC to a first temperature at which the DOC activates; and a second temperature increase process to control the temperature increase unit after completion of the first temperature increase process so as to increase the temperature of the DOC to a second temperature higher than the first temperature, wherein the temperature increase unit includes a fuel injection device for injecting fuel to a combustion chamber of the diesel engine, wherein the first temperature increase process and the second temperature increase process are executed by early-post injection with the fuel injection device, and wherein a fuel injection amount is greater in the second temperature increase process than in the first temperature increase process, or an injection timing varies between the first temperature increase process and the second temperature increase process, or the fuel injection amount is greater in the second temperature increase process than in the first temperature increase process and the injection timing varies between the first temperature increase process and the second temperature increase process.

2. The regeneration control device according to claim 1, wherein the DOC temperature increase control is configured to be completed after elapse of a predetermined time after the second temperature increase process starts, or after elapse of a predetermined time after the second temperature increase process starts and reaches the second temperature.

3. A regeneration control device controlling a temperature increase unit of an exhaust gas treatment device including a diesel oxidation catalyst (DOC) disposed in an exhaust passage of a diesel engine to regenerate the exhaust gas treatment device, the regeneration control device comprising:

a DOC temperature-increase-necessary-state detection part configured to detect a temperature increase necessary state including at least one of a blockage state of the DOC or a blockage risk state of the DOC, the blockage state being detected on the basis of comparison between a blockage parameter related to blockage of the DOC and a predetermined blockage threshold, the blockage risk state being detected when the diesel engine is in an operating state that is likely to cause blockage of the DOC; and a DOC temperature increase execution part configured to execute a DOC temperature increase control including a first temperature increase process to control the temperature increase unit, if the temperature increase necessary state of the DOC is detected, so as to increase a temperature of the DOC to a first temperature at which the DOC activates, and a second temperature increase process to control the temperature increase unit after completion of the first temperature increase process so as to increase the temperature of the DOC to a second temperature higher than the first temperature, wherein the exhaust gas treatment device further includes a DPF disposed in the exhaust passage and downstream of the DOC, wherein the regeneration control device further includes a DPF forced regeneration execution part configured to execute a forced regeneration process to control the temperature increase unit so as to increase a temperature of the DPF to a third temperature, and wherein the second temperature is higher than the first temperature and is lower than the third temperature.

4. The regeneration control device according to claim 3, wherein the DOC temperature-increase-necessary-state detection part is configured to detect the blockage parameter during execution of the forced regeneration process, and wherein the DPF forced regeneration execution part stops the forced regeneration process if the DOC temperature-increase-necessary-state detection part detects the blockage state of the DOC.

5. The regeneration control device according to claim 4, wherein the DPF forced regeneration execution part automatically executes the forced regeneration process or issues notification to prompt execution of the forced regeneration process, after completion of the DOC temperature increase control.

6. The regeneration control device according to claim 3, wherein the regeneration control device further includes a DPF forced-regeneration-condition determination part configured to determine whether a forced regeneration execution condition for the DPF is satisfied, and wherein the DPF forced regeneration execution part automatically executes the forced regeneration process or issues notification to prompt execution of the forced regeneration process, after completion of the DOC temperature increase control, if the DPF forced-regeneration-condition determination part determines that the forced regeneration execution condition is satisfied after completion of the second temperature increase process.

7. The regeneration control device according to claim 3, wherein the temperature increase unit includes a fuel injection device for injecting a fuel to a combustion chamber of the diesel engine, wherein the forced regeneration process is executed by early-post injection with the fuel injection device and by late-post injection with the fuel injection device or exhaust pipe injection with an exhaust pipe injection device disposed in the exhaust passage and upstream of the DOC.

8. The regeneration control device according to claim 3, wherein the blockage parameter is an outlet temperature of the DPF.

9. The regeneration control device according to claim 1, wherein, during normal operation in which the forced regeneration process is not performed, the DOC temperature-increase-necessary-state detection part detects the blockage risk state of the DOC if an accumulated duration time, within a latest predetermined period, of a low exhaust temperature operation state exceeds a predetermined threshold, the low exhaust temperature operation state being a state where an exhaust gas temperature is lower than an exhaust temperature threshold.

10. The regeneration control device according to claim 1, further comprising a storage part for storing detection information indicating that the DOC temperature-increase-necessary-state detection part detects the temperature increase necessary state of the DOC.

11. The regeneration control device according to claim 1, further comprising:

a notification part configured to output a regeneration request and thereby notify an operator that the DOC temperature-increase-necessary-state detection part detects the temperature increase necessary state of the DOC; and an execution instruction receiving part configured to receive, from the operator, a response to the regeneration request output from the notification part, as a regeneration execution instruction, wherein the notification part outputs the regeneration request when an ignition key is turned on, and wherein the DOC temperature increase execution part executes the DOC temperature increase control if the execution instruction receiving part receives the regeneration execution instruction.

12. The regeneration control device according to claim 11, wherein the notification part issues notification to prompt turning-off of the ignition key when the DOC temperature-increase-necessary-state detection part detects the temperature increase necessary state of the DOC.

13. The regeneration control device according to claim 1, further comprising:
a notification part configured to output a regeneration request and thereby notify an operator that the DOC temperature-increase-necessary-state detection part detects the temperature increase necessary state of the DOC; and
an execution instruction receiving part configured to receive, from the operator, a response to the regeneration request output from the notification part, as a regeneration execution instruction,
wherein the notification part outputs the regeneration request without waiting for turning-off of an ignition key if the ignition key is not tuned off for a predetermined time after the DOC temperature-increase-necessary-state detection part detects the temperature increase necessary state of the DOC, and
wherein the DOC temperature increase execution part executes the DOC temperature increase control if the execution instruction receiving part receives the regeneration execution instruction.

14. The regeneration control device according to claim 1, further comprising an informing part configured to inform the DOC temperature increase execution part that the DOC temperature-increase-necessary-state detection part detects the temperature increase necessary state of the DOC,
wherein the informing part informs the DOC temperature increase execution part of detection of the temperature increase necessary state of the DOC when an ignition key is turned on, and
wherein, once the DOC temperature increase execution part is informed of detection of the temperature increase necessary state of the DOC by the informing part, the DOC temperature increase execution part automatically executes the DOC temperature increase control.

15. The regeneration control device according to claim 1, further comprising an informing part configured to inform the DOC temperature increase execution part that the DOC temperature-increase-necessary-state detection part detects the temperature increase necessary state of the DOC,
wherein the informing part informs the DOC temperature increase execution part of detection of the temperature increase necessary state of the DOC without waiting for turning-off of an ignition key if the ignition key is not tuned off for a predetermined time after the DOC temperature-increase-necessary-state detection part detects the temperature increase necessary state of the DOC, and
wherein, once the DOC temperature increase execution part is informed of detection of the temperature increase necessary state of the DOC by the informing part, the DOC temperature increase execution part automatically executes the DOC temperature increase control.

16. The regeneration control device according to claim 1, further comprising an informing part configured to inform the DOC temperature increase execution part that the DOC temperature-increase-necessary-state detection part detects the temperature increase necessary state of the DOC,
wherein the informing part informs the DOC temperature increase execution part of detection of the temperature increase necessary state of the DOC if an ignition key is not tuned off for a predetermined time after the DOC temperature-increase-necessary-state detection part detects the temperature increase necessary state of the DOC and further if a temperature increase starting condition is satisfied,
wherein, once the DOC temperature increase execution part is informed of detection of the temperature increase necessary state of the DOC by the informing part, the DOC temperature increase execution part automatically executes the DOC temperature increase control, and
wherein the temperature increase starting condition includes a DOC activation condition including at least one of the following conditions: if an inlet temperature of the DOC or an outlet temperature of the DOC exceeds a predetermined value; or if an operation state of the engine is within a predetermined operation range which permits to increase to the first temperature.

17. The regeneration control device according to claim 16,
wherein the exhaust gas treatment device includes a DPF disposed in the exhaust passage and downstream of the DOC,
wherein the regeneration control device further includes a DPF forced-regeneration-condition determination part configured to determine whether a forced regeneration execution condition for the DPF is satisfied,
wherein the temperature increase starting condition further includes the forced regeneration execution condition for the DPF, and
wherein the informing part determines that the temperature increase starting condition is satisfied if the DOC activation condition and the forced regeneration execution condition for the DPF are satisfied.

18. A regeneration control device, controlling a temperature increase unit of an exhaust gas treatment device including a diesel oxidation catalyst (DOC) disposed in an exhaust passage of a diesel engine to regenerate the exhaust gas treatment device, the regeneration control device comprising:
a DOC temperature-increase-necessary-state detection part configured to detect a temperature increase necessary state including at least one of a blockage state of the DOC or a blockage risk state of the DOC, the blockage state being detected on the basis of comparison between a blockage parameter related to blockage of the DOC and a predetermined blockage threshold, the blockage risk state being detected when the diesel engine is in an operating state that is likely to cause blockage of the DOC; and
a DOC temperature increase execution part configured to execute a DOC temperature increase control including: a first temperature increase process to control the temperature increase unit, if the temperature increase necessary state of the DOC is detected, so as to increase a temperature of the DOC to a first temperature at which the DOC activates; and a second temperature increase process to control the temperature increase unit after completion of the first temperature increase process so as to increase the temperature of the DOC to a second temperature higher than the first temperature,
wherein the second temperature is within a range of 380° C. to 480° C.

* * * * *